United States Patent
Hartman

(10) Patent No.: US 10,124,772 B1
(45) Date of Patent: Nov. 13, 2018

(54) SYSTEMS, METHODS, AND APPARATUS FOR DEBRIS REMOVAL

(71) Applicant: Todd James Hartman, Hummelstown, PA (US)

(72) Inventor: Todd James Hartman, Hummelstown, PA (US)

( * ) Notice: Subject to any disclaimer, the term of this patent is extended or adjusted under 35 U.S.C. 154(b) by 945 days.

(21) Appl. No.: 14/517,795

(22) Filed: Oct. 17, 2014

Related U.S. Application Data

(60) Provisional application No. 61/893,137, filed on Oct. 18, 2013.

(51) Int. Cl.
*B60S 3/04* (2006.01)
*B08B 7/02* (2006.01)

(52) U.S. Cl.
CPC . *B60S 3/04* (2013.01); *B08B 7/02* (2013.01)

(58) Field of Classification Search
None
See application file for complete search history.

(56) References Cited

U.S. PATENT DOCUMENTS

| | | | |
|---|---|---|---|
| 3,952,159 A | 4/1976 | Schott | |
| 4,008,374 A | 2/1977 | Tiefenbrun | |
| 4,704,028 A * | 11/1987 | Richards, Sr. | G03B 27/20 355/92 |
| 4,790,408 A | 12/1988 | Adair | |
| 4,833,373 A | 5/1989 | Doi | |
| 5,147,986 A | 9/1992 | Cockrum | |
| 5,148,312 A | 9/1992 | Kawai | |
| 5,172,024 A | 12/1992 | Broussoux | |
| 5,313,525 A | 5/1994 | Klasco | |
| 5,471,019 A | 11/1995 | Maire | |
| 5,562,265 A * | 10/1996 | Rauckhorst, III | B64D 15/166 244/134 A |
| 5,664,824 A | 9/1997 | Stephens | |
| 5,724,186 A | 3/1998 | Collier | |
| 5,821,471 A | 10/1998 | McCuller | |
| 5,890,580 A | 4/1999 | Hashimoto | |
| 6,062,339 A | 5/2000 | Hathaway | |
| 6,223,853 B1 | 5/2001 | Huon | |
| 6,328,024 B1 | 12/2001 | Kibort | |
| 6,368,174 B1 * | 4/2002 | Magee | B63C 9/20 441/106 |
| 6,389,146 B1 | 5/2002 | Croft | |
| 6,696,674 B1 | 2/2004 | Doornsbosch | |

(Continued)

OTHER PUBLICATIONS

Subwoofer Enclosures, Sixth and Eighth Order, Bass Reflex, and Bandpass, http://www.the12volt.com/caraudio/boxes6.asp, Sep. 12, 2012 from the Wayback Machine, retrieved on Wayback MachineDec. 20, 2017.*

(Continued)

*Primary Examiner* — Nicole Blan

(57) ABSTRACT

In one example, a method of debris removal includes pressurizing a chamber to displace an elastic top surface of the chamber upward, and modulating the pressure of the mass of air within the chamber to cause the elastic top surface to oscillate in response. When the elastic top surface has been installed on the top surface of a vehicle (e.g., a semi-trailer), such oscillation may be used to impart movement to debris that has accumulated on or over the elastic top surface and remove such debris from the vehicle.

21 Claims, 28 Drawing Sheets

(56) References Cited

U.S. PATENT DOCUMENTS

| | | | |
|---|---|---|---|
| 6,743,298 B2 | 6/2004 | Schmid | |
| 6,890,152 B1 * | 5/2005 | Thisted | F03D 80/40 416/1 |
| 7,103,193 B2 | 9/2006 | Croft | |
| 7,136,498 B1 | 11/2006 | Schott | |
| 8,146,866 B2 | 4/2012 | Tenebre | |
| 8,500,157 B2 | 8/2013 | Schneider | |
| 2002/0003888 A1 | 1/2002 | Budge | |
| 2002/0121799 A1 | 9/2002 | Buker | |
| 2003/0174851 A1 | 9/2003 | Plummer | |
| 2003/0192427 A1 | 10/2003 | Geller | |
| 2004/0016484 A1 | 1/2004 | Muller | |
| 2004/0016485 A1 | 1/2004 | Muller | |
| 2004/0101690 A1 | 5/2004 | Saitoh | |
| 2004/0239142 A1 | 12/2004 | Poyntz | |
| 2004/0261325 A1 | 12/2004 | Glynos | |
| 2005/0017536 A1 | 1/2005 | Dapprich | |
| 2005/0057069 A1 | 3/2005 | McNamara | |
| 2006/0055200 A1 | 3/2006 | Yang | |
| 2006/0056650 A1 | 3/2006 | Hofmann | |
| 2006/0101569 A1 | 5/2006 | Tripp | |
| 2006/0150537 A1 | 7/2006 | Baum | |
| 2006/0218731 A1 * | 10/2006 | Muhl | B65G 69/2817 14/71.3 |
| 2006/0279102 A1 | 12/2006 | Carroll | |
| 2006/0284518 A1 | 12/2006 | Ludwiczak | |
| 2006/0285695 A1 | 12/2006 | Keys | |
| 2007/0003076 A1 | 1/2007 | Croft | |
| 2007/0144425 A1 | 6/2007 | Buckley | |
| 2007/0237350 A1 | 10/2007 | Milnes | |
| 2007/0251618 A1 | 11/2007 | Brown | |
| 2008/0054762 A1 | 3/2008 | Ludwiczak | |
| 2008/0060262 A1 | 3/2008 | Lysa | |
| 2008/0134586 A1 | 6/2008 | Davis | |
| 2009/0013610 A1 | 1/2009 | Glynos | |
| 2009/0025769 A1 | 1/2009 | Buckley | |
| 2009/0056233 A1 | 3/2009 | Chromoy | |
| 2009/0056780 A1 | 3/2009 | Glynos | |
| 2009/0127251 A1 | 5/2009 | Naylor | |
| 2009/0158517 A1 | 6/2009 | Herd | |
| 2009/0167049 A1 | 7/2009 | Lariviere | |
| 2009/0235496 A1 | 9/2009 | Baum | |
| 2009/0249700 A1 | 10/2009 | Peterson | |
| 2010/0019153 A1 * | 1/2010 | Zalameda | G01N 25/72 250/339.02 |
| 2010/0052357 A1 | 3/2010 | Howell | |
| 2010/0058682 A1 | 3/2010 | Grunewald | |
| 2010/0083436 A1 | 4/2010 | Wiegand | |
| 2010/0083587 A1 | 4/2010 | Glynos | |
| 2010/0095993 A1 | 4/2010 | Jesus | |
| 2010/0123331 A1 | 5/2010 | Buelna | |
| 2010/0147343 A1 | 6/2010 | Devries | |
| 2010/0147821 A1 | 6/2010 | Kaesler | |
| 2010/0164246 A1 | 7/2010 | Schaefer | |
| 2011/0000518 A1 | 1/2011 | Kojima | |
| 2011/0036823 A1 | 2/2011 | Nelson | |
| 2011/0115247 A1 | 5/2011 | Eggers | |
| 2011/0259866 A1 | 10/2011 | Nelson | |
| 2011/0265684 A1 | 11/2011 | Knight | |
| 2011/0271521 A1 | 11/2011 | Keys | |
| 2012/0048140 A1 | 3/2012 | Dial | |
| 2012/0074262 A1 | 3/2012 | Chuc | |
| 2012/0204439 A1 | 8/2012 | Kloepfer | |
| 2012/0219171 A1 | 8/2012 | Velican | |
| 2012/0261939 A1 | 10/2012 | Schmeichel | |
| 2013/0014793 A1 | 1/2013 | Gerengi | |
| 2013/0106135 A1 | 5/2013 | Praskovsky | |
| 2013/0204461 A1 | 8/2013 | Kartes | |
| 2013/0277464 A1 * | 10/2013 | Mitchell | B02C 19/18 241/1 |

OTHER PUBLICATIONS

American Transportation Research Institute, Dec. 2008. Snow and Ice Accumulation on Vehicles (39 pp.).

AP Enclosures—The Aperiodic Cookbook | Tutorials | Team Audionutz (7 pp.) Accessed Oct. 8, 2013 at http://www.teamaudionutz.com.

Car-Fi's Tech Center—Woofer Enclosure Designs (4 pp.). Accessed Oct. 9, 2013 at http://www.car-fi.com/techcenter/enclosures.htm.

Car Audio Subwoofer Enclosures Fourth Order/Bass Reflex and Bandpass (3 pp.). Accessed Oct. 8, 2013 at http://www.the12volt.com/caraudio/boxes4.asp.

Cleaning off tractor trailers (3 pp.) Accessed Oct. 6, 2013 at http://www.plowsite.com/archive/index.php/t-133408.html.

Custom Car Audio Boxes (4 pp.) Accessed Oct. 8, 2013 at http://www.caraudiohelp.com.

GlassWolf's Pages (5 pp.) Accessed Oct. 8, 2013 at http://www.glasswolf.net/papers/boxtypes.html.

Goraj, Z. An Overview of the Deicing and Antiicing Technologies With Prospects for the Future. 24th Int'l Cong. Aeronaut. Sci. (11 pp.).

Intro to Enclosures | Kicker (4 pp.) Accessed Oct. 9, 2013 at http://www.kicker.com.

Isobaric loudspeaker (4 pp.) Accessed Oct. 7, 2013 at http://wikipedia.com.

JL Audio. Isobaric Types_ Back-to-Back (2 pp.) Accessed Oct. 9, 2013 at http://www.jlaudio.com.

JL Audio. Isobaric Types_ Clamshell (2 pp.) Accessed Oct. 9, 2013 at http://www.jlaudio.com.

JL Audio. Isobaric Types_ Piggy-Back (2 pp.) Accessed Oct. 9, 2013 at http://www.jlaudio.com.

JL Audio. Tutorial: Bandpass Enclosure Characteristics (3 pp.) Accessed Oct. 9 2013 at http://www.jlaudio.com.

Palacios, J.L. et al. Investigation of an Ultrasonic Ice Protection System for Helicopter Rotor Blades (10 pp.) Accessed Sep. 8, 2013 at https://home.comcast.net/~jlp324/Icing/Final%20Palacios%20AHS%202008%20-%20Ultrasonic%20Ice%20Protection.pdf.

Subwoofer Enclosures, Sixth and Eigth Order/Bass Reflex and Bandpass. (3 pp.) Accessed Oct. 8, 2013 at http://www.the12volt.com/caraudio/boxes6.asp.

Xtant Tech Support—Enclosure Design & Construction (9 pp.) Accessed Oct. 8, 2013 at http://www.xtant.com/archives/html/techsupport/enclosures.cfm.

\* cited by examiner

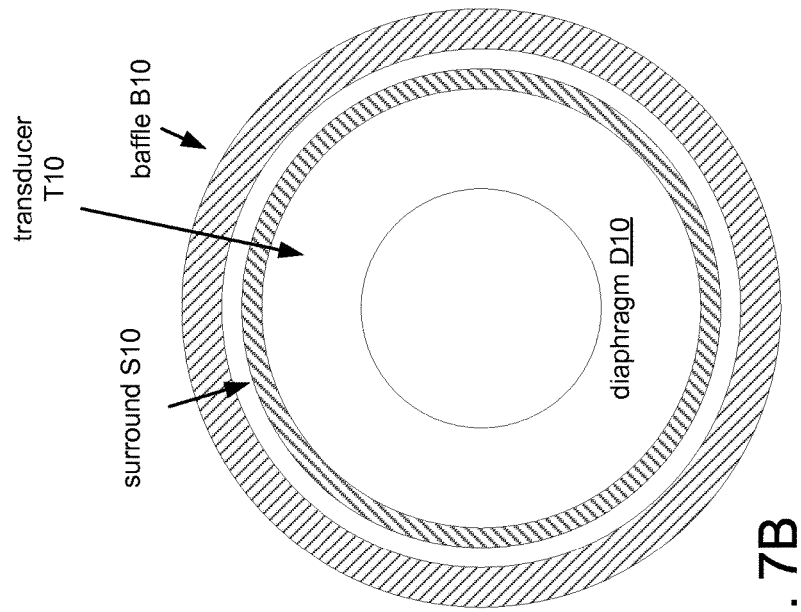
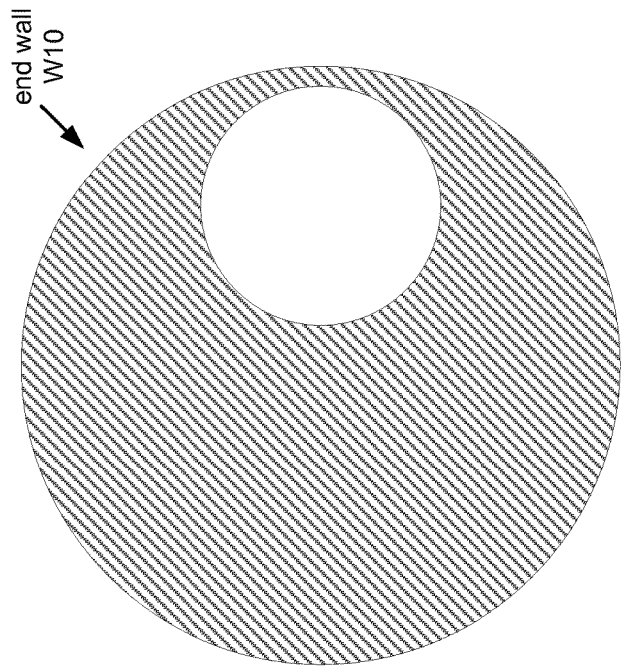
FIG. 7B
FIG. 7A

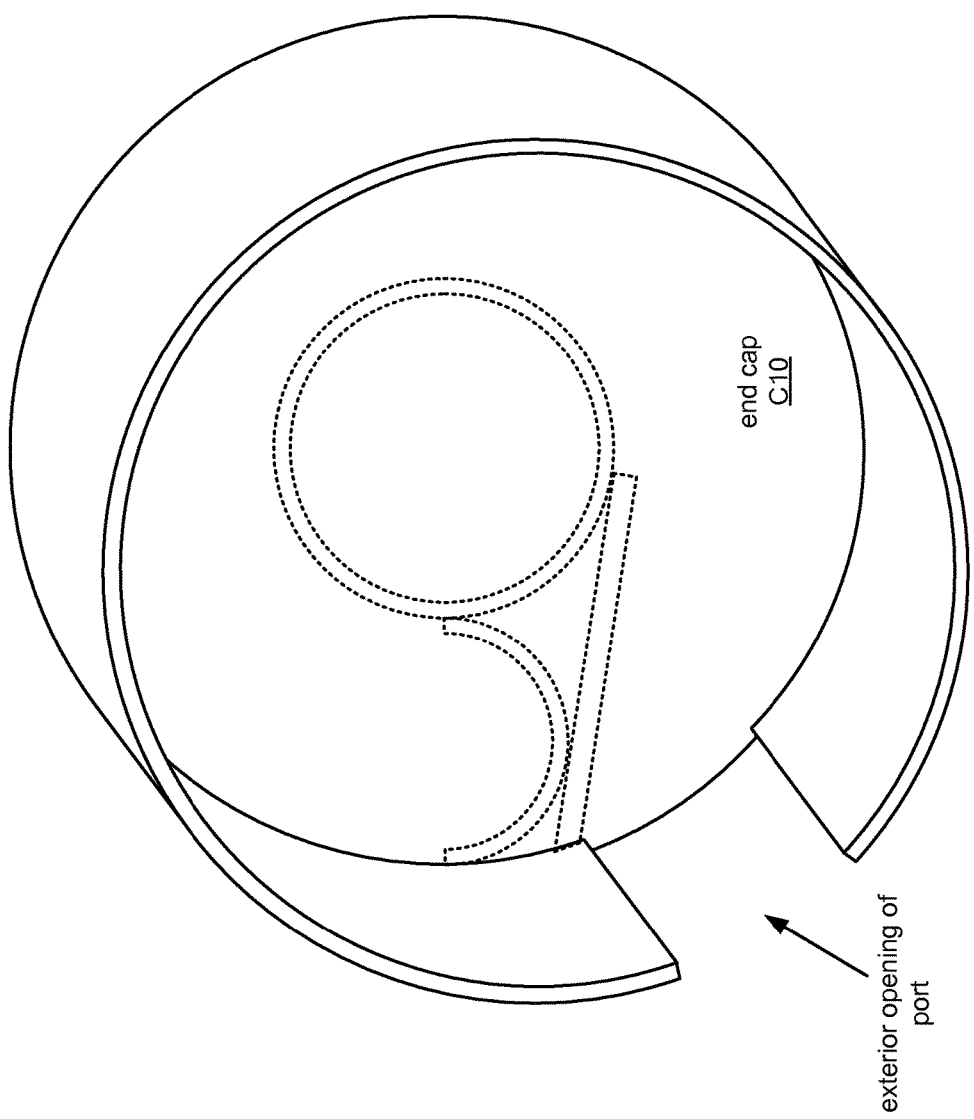

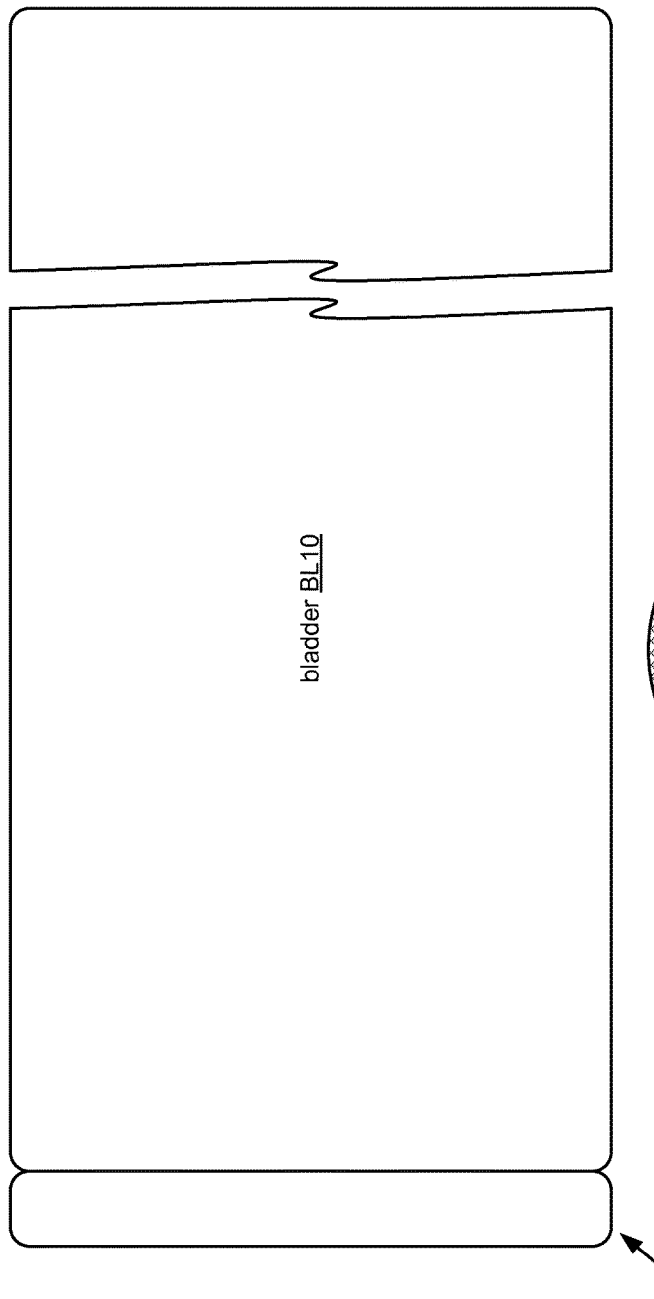
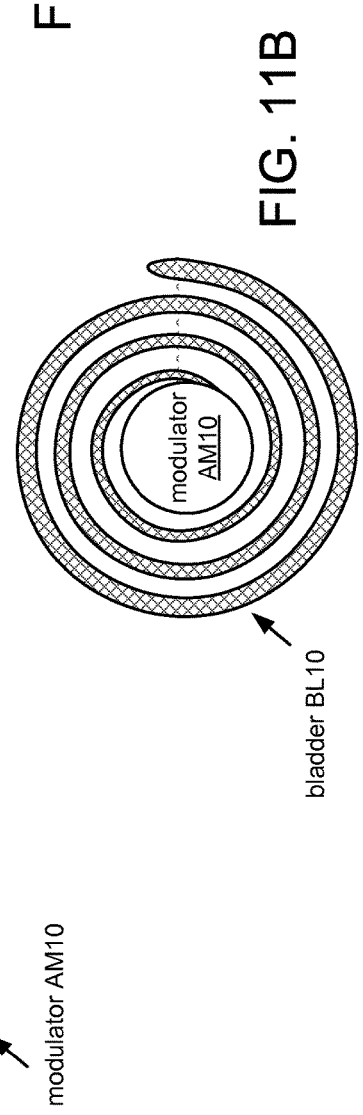

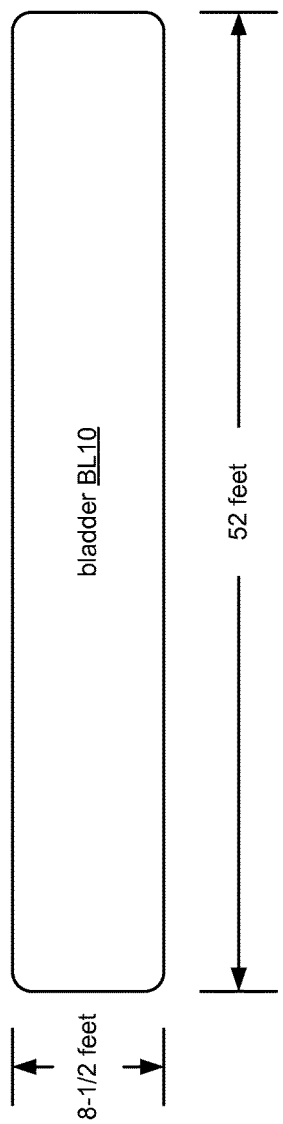
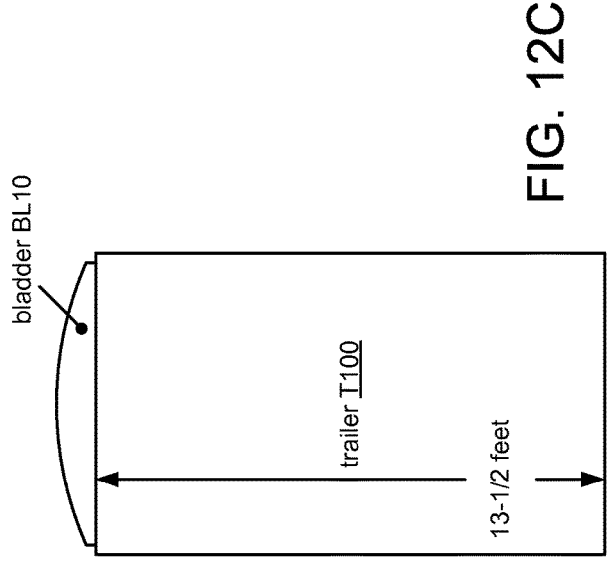
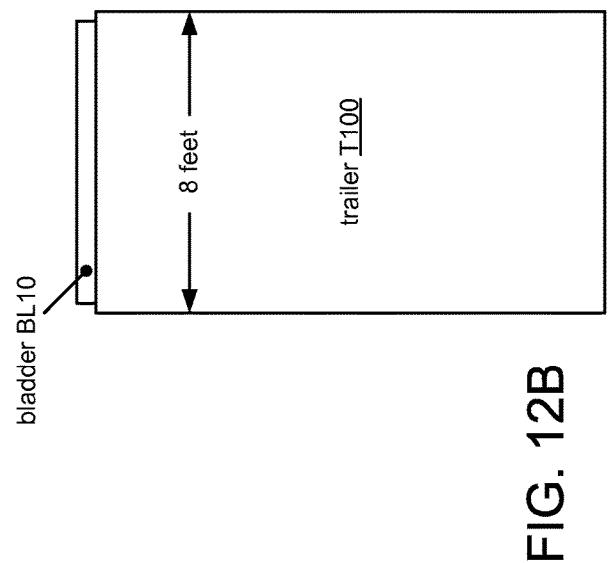

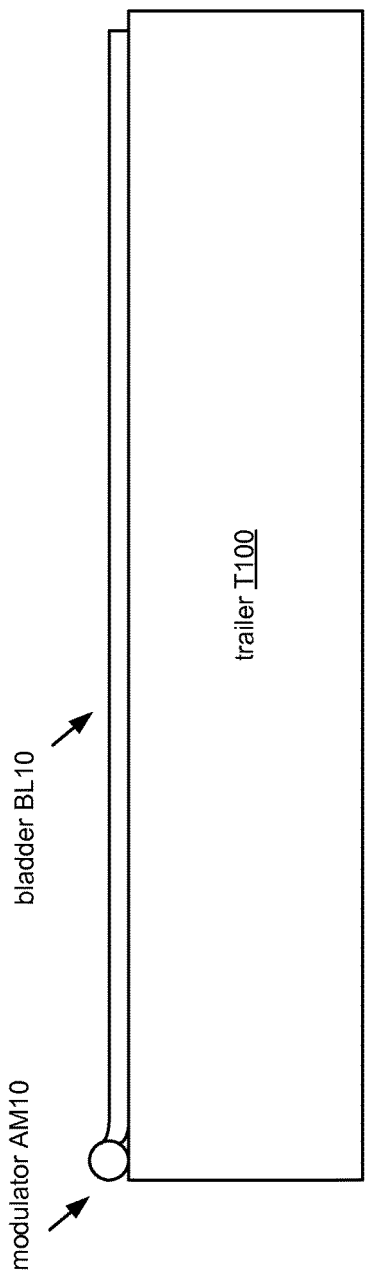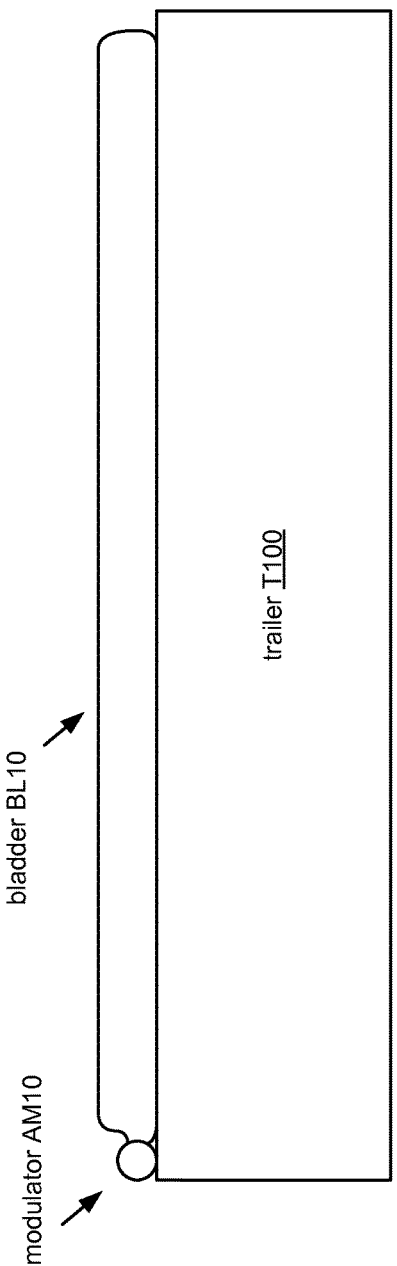

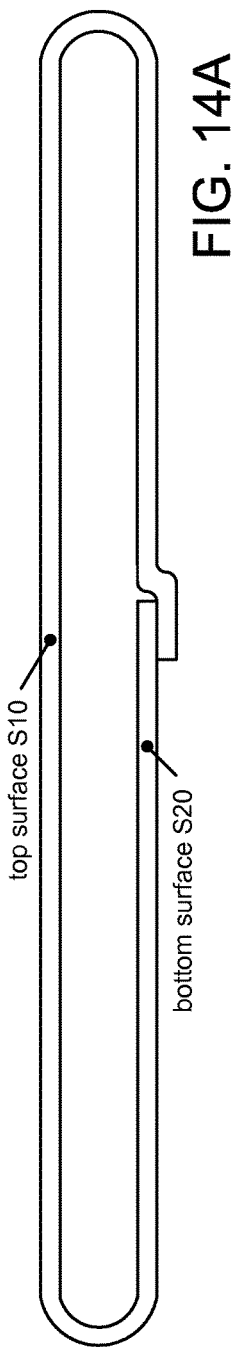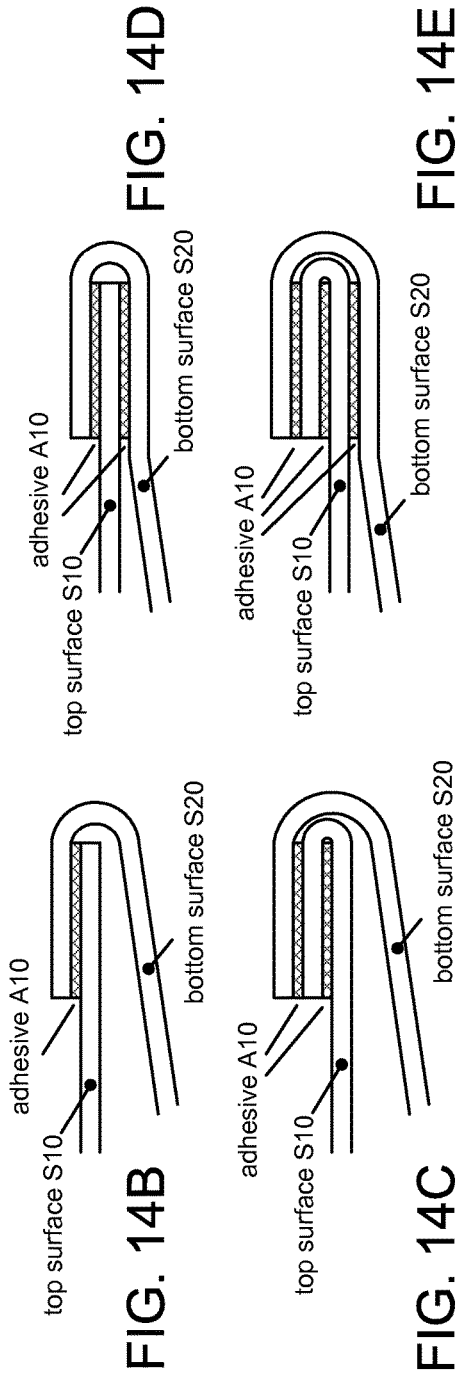

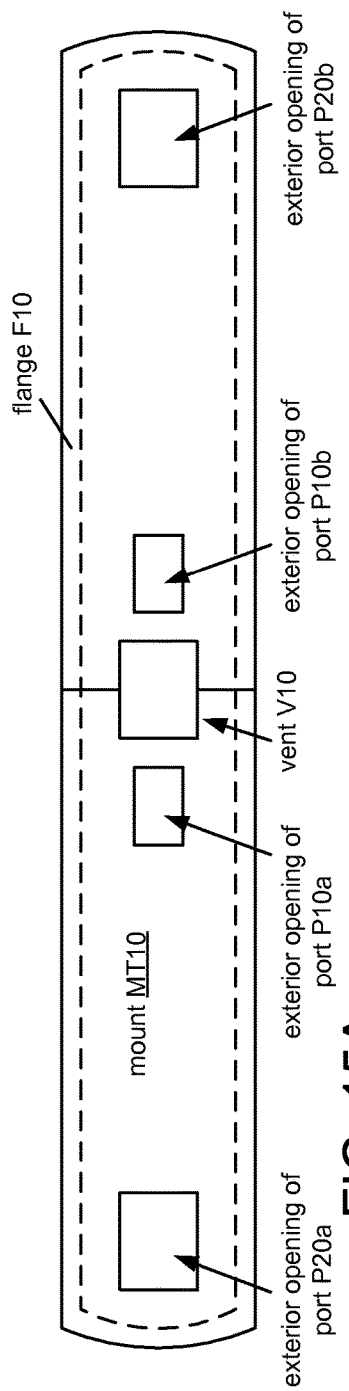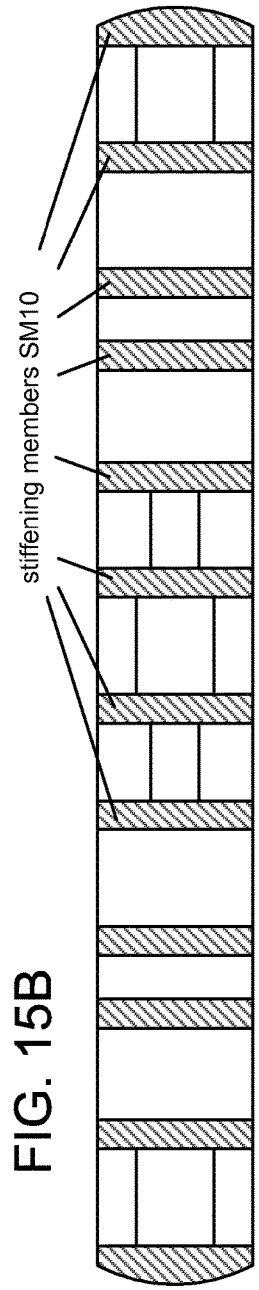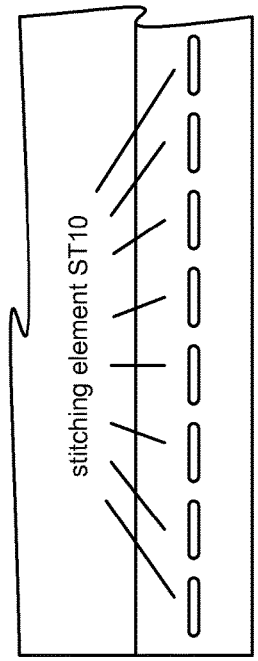
FIG. 15A
FIG. 15B
FIG. 15C

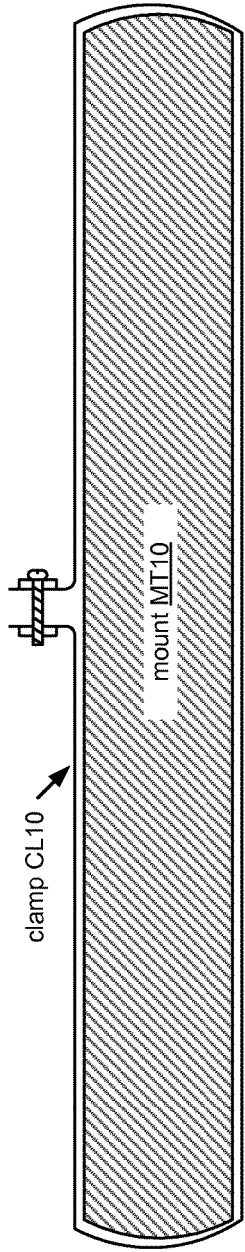
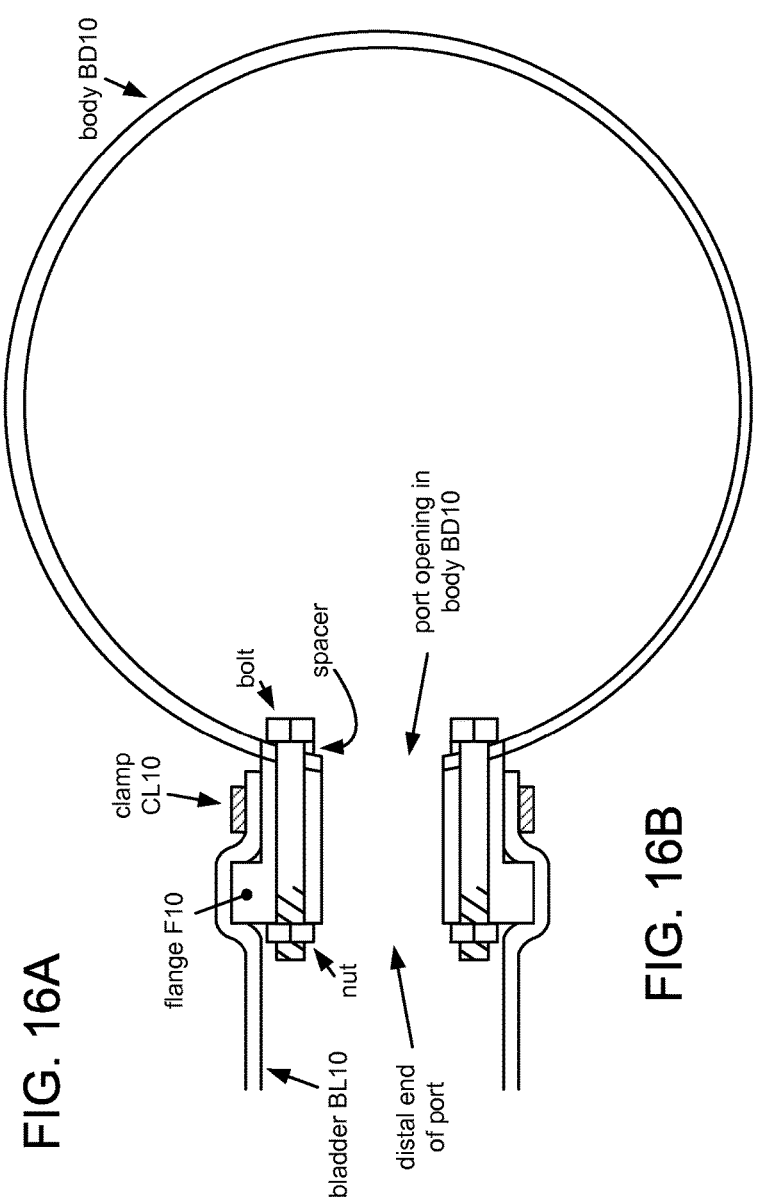
FIG. 16A
FIG. 16B

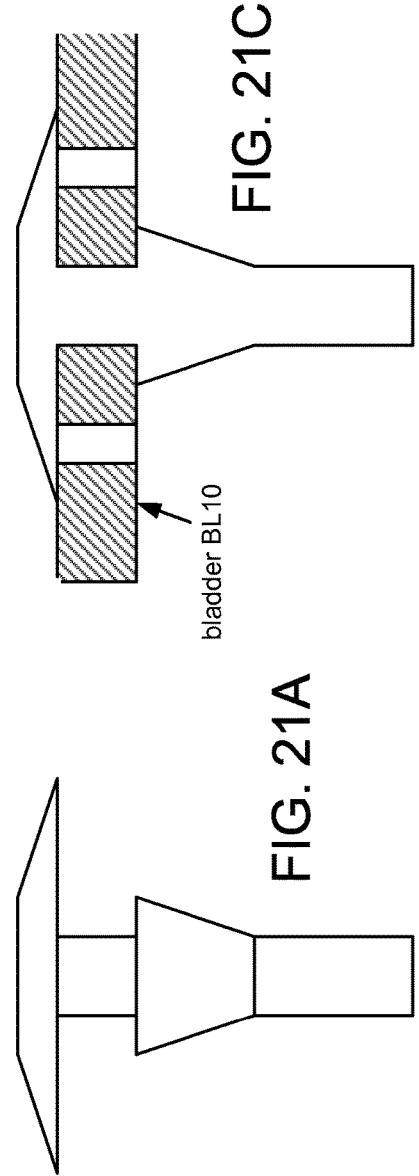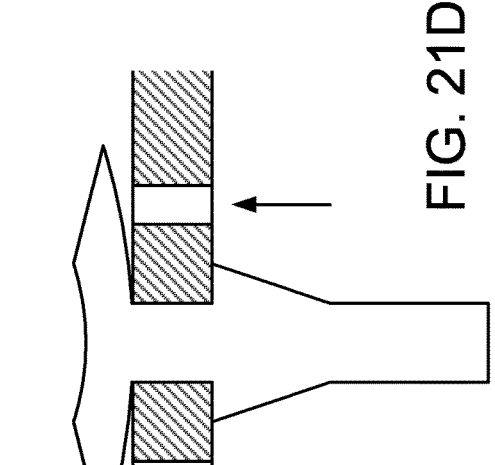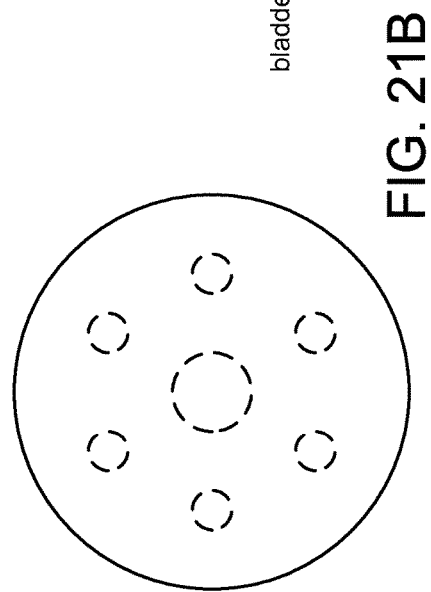

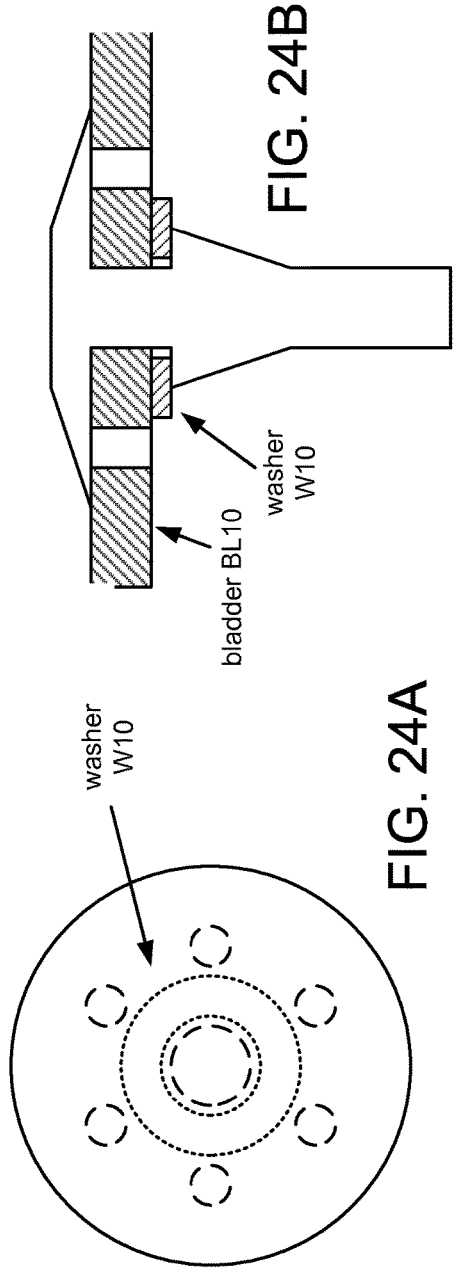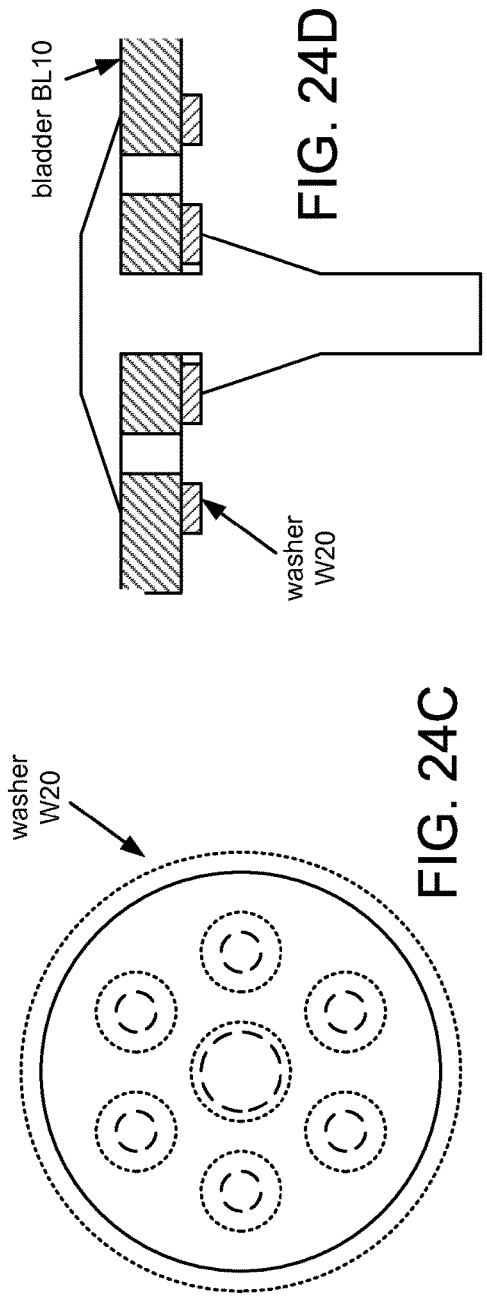

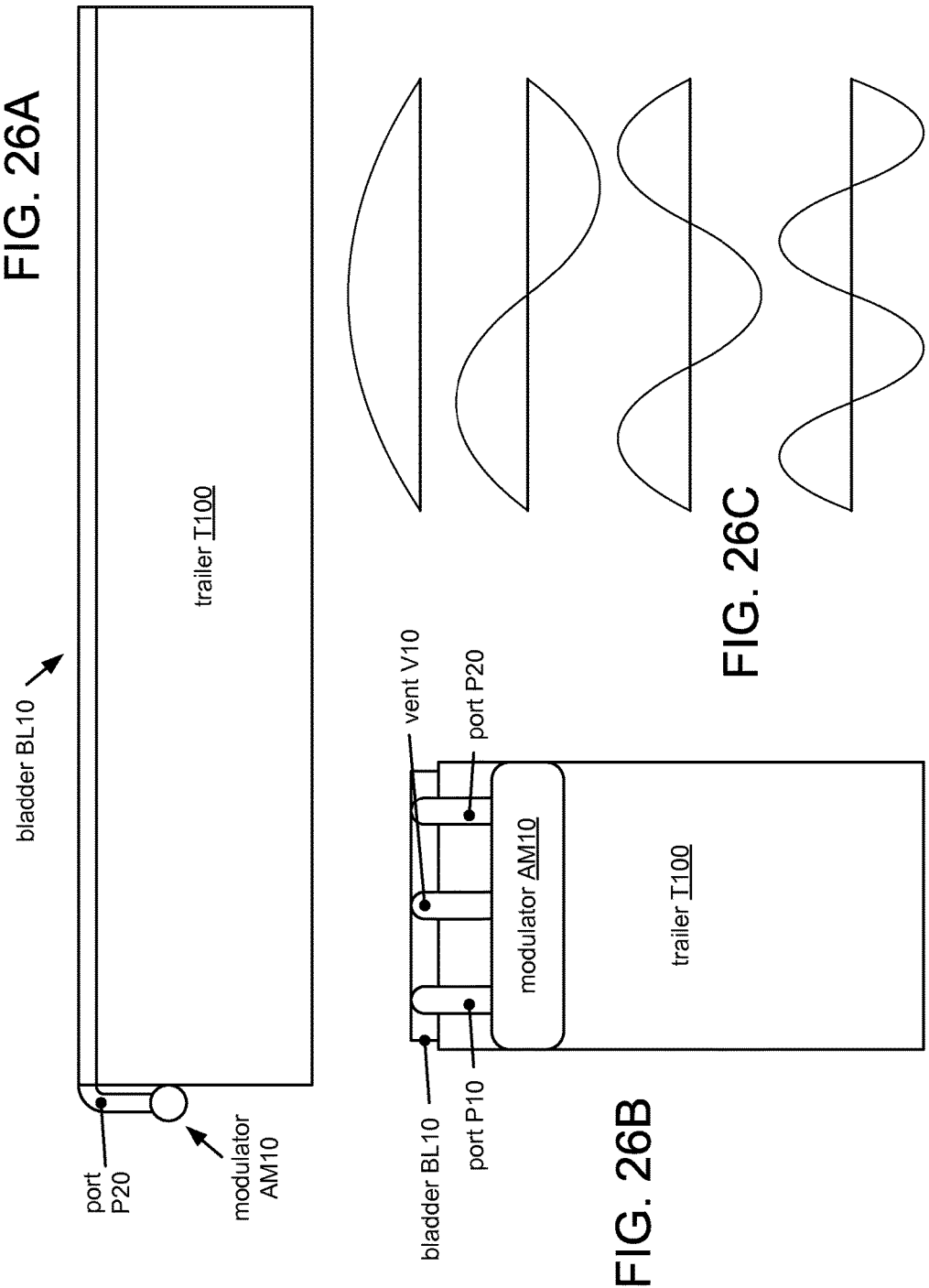

SYSTEMS, METHODS, AND APPARATUS FOR DEBRIS REMOVAL

RELATED APPLICATIONS

This patent application claims benefit of U.S. Provisional Pat. Appl. No. 61/893,137, entitled "SYSTEMS, METHODS, AND APPARATUS FOR DEBRIS REMOVAL," filed Oct. 18, 2013, which application is hereby incorporated by reference in its entirety as if set forth herein.

FIELD

This disclosure relates to removal of debris (e.g., solid matter, such as snow and/or ice) from a surface of a structure.

BACKGROUND

Frozen precipitation and/or other debris may accumulate on the top surface (e.g., the roof) of a vehicle while the vehicle is stationary (e.g., stopped or parked) or moving. Such frozen precipitation may include any one or more of, for example, snow, ice, sleet, freezing rain, and hail.

Examples of vehicles include road vehicles, such as passenger or cargo vans, trucks, trailers, semi-trailers, tractors for hauling semi-trailers, recreational vehicles, and structures being transported via trailer (e.g., mobile homes and pre-fabricated housing units). The top surface of such a vehicle may have tens or hundreds of square feet of surface area, such that the mass of accumulated debris may be substantial.

When the vehicle is in motion, the accumulated debris may blow or fall away from the vehicle, which may create hazards for other drivers. Such hazards may include reduced visibility, danger of impact by large solid masses (e.g., falling blocks of ice), and/or road obstacles (e.g., large masses of fallen snow or ice).

Many jurisdictions (e.g., countries, states, cities, and counties) have statutes and/or regulations in place that require the removal of accumulated snow and/or ice from a vehicle before it is operated on the road. The problem of snow and ice accumulation on vehicles is also the subject of a report issued by the American Transportation Research Institute in December 2008.

Manually clearing snow and/or ice from the top surface of a vehicle (e.g., using a shovel or manually operated scraper) can be dangerous. The standard height of a semi-trailer is thirteen and one-half feet, and the height of the wheel assembly can add several feet to this distance. Mounting a ladder and/or climbing to reach a roof at such a height can be especially dangerous under the slippery conditions that typically accompany the presence of frozen precipitation. Such manual work is also time-consuming and tiring: the surface area of the top of a typical semi-trailer is eight-and-one-half by fifty-three feet (i.e., 450.5 square feet), such that the total weight of several inches of accumulated snow can easily exceed one thousand pounds. In some climates, re-accumulation of snow and ice can occur frequently (even daily) during the winter season.

Other ways of removing accumulated frozen precipitation from the top surface of a vehicle include driving the vehicle under a stationary scraper to clear the surface or using heat and/or chemicals to melt the frozen precipitation. However, facilities to practice such removal methods are typically expensive to install and thus are typically available only at limited locations. Such use of chemicals may also present environmental concerns.

SUMMARY

A system according to one implementation includes a pressure generator arranged to increase a pressure of a mass of air within a chamber; an acoustic modulator arranged to modulate the pressure of the mass of air within the chamber; and an elastic surface arranged to form a top of the chamber. The elastic surface is configured to stretch outward in response to the increased pressure and to oscillate in response to the air pressure modulation. In one example, the chamber is an inflatable bladder, and the elastic surface is a top surface of the bladder.

A system according to another implementation includes a pressure generator arranged to inflate a chamber to a pressure that is higher than a pressure of the ambient environment; an acoustic modulator arranged to induce a pressure wave within the chamber; and an elastic surface arranged to form a top of the chamber. The elastic surface is configured to stretch outward in response to the increased pressure and to oscillate in response to the air pressure modulation. In one example, the chamber is an inflatable bladder, and the elastic surface is a top surface of the bladder.

A method for debris removal according to another implementation includes inflating a chamber to an air pressure that is higher than an air pressure of an ambient environment of the chamber. A top of the chamber is an elastic surface configured to stretch outward in response to the higher pressure. This method also includes inducing a pressure wave within the inflated chamber, causing the elastic surface to oscillate in response to the pressure wave.

BRIEF DESCRIPTION OF THE DRAWINGS

FIG. 7A shows an example of end wall W10.

FIG. 7B shows an example of baffle B10.

FIGS. 8 and 9 show an example of a construction of an implementation of port P10 or P20.

FIG. 11A shows a top view of an implementation of system S100 as installed.

FIG. 11B shows a side view of an implementation of system S100 ready for removal or storage.

FIG. 12A shows a top view of an example of bladder BL10.

FIGS. 12B and 12C show rear views of an example of bladder BL10 as installed on a semi-trailer of standard height.

FIGS. 13A and 13B show side views of an installation of an implementation of system S100 before and during inflation, respectively.

FIG. 14A shows a crosswise cross-sectional view of an implementation of bladder BL10.

FIGS. 14B-14E show lengthwise cross-sectional views of a distal end of various examples of bladder BL10.

FIG. 14F shows a crosswise cross-sectional view of an implementation of bladder BL10 formed from two separate sheets of elastomer.

FIG. 15A shows a front view of mount MT10.

FIG. 15B shows a cross-sectional view of mount MT10.

FIG. 15C shows a seal of bladder BL10 as reinforced using a stitching element ST10.

FIG. 16A shows a clamp CL10 in position around mount MT10.

FIG. 16B shows a cross-wise cross-sectional view of bladder BL10 as attached to modulator AM10 via mount MT10 and clamp CL10.

FIGS. 21A and 21B show cross-sectional and top views of an umbrella valve, respectively.

FIGS. 21C and 21D show cross-sectional views of an umbrella valve as installed in a hole in bladder BL10.

FIGS. 24A and 24B show top and cross-sectional views, respectively, of a washer W10 installed to reinforce the valve seat of bladder BL10.

FIGS. 24C and 24D show top and cross-sectional views, respectively, of a washer W20 installed to reinforce the valve seat and the flow orifices of bladder BL10.

FIGS. 26A and 26B show side and front views, respectively, of an installation of another implementation of system S100.

FIG. 26C shows the first four standing wave orders along an axis of a surface.

DETAILED DESCRIPTION

Principles described herein may be used to implement a flexible cover that may be removably installed on or over the top of a truck roof (e.g., before inclement weather) to remove debris such as ice and/or snow that accumulates on the roof before the truck is operated on the road. Activation of the cover causes it to shed debris that has accumulated on its surface (e.g., through a process of inflation and vibration, or of inflation, vibration, and blowing, as described herein). Activation of the cover may also break up and/or dislodge the accumulated debris (e.g., ice and/or snow). The cover may be installed before or during ice and/or snow conditions and then removed upon the arrival of warmer weather. In a particular example, the cover is the top surface of a bladder that is installed on the roof of a semi-trailer.

Figure 1A:
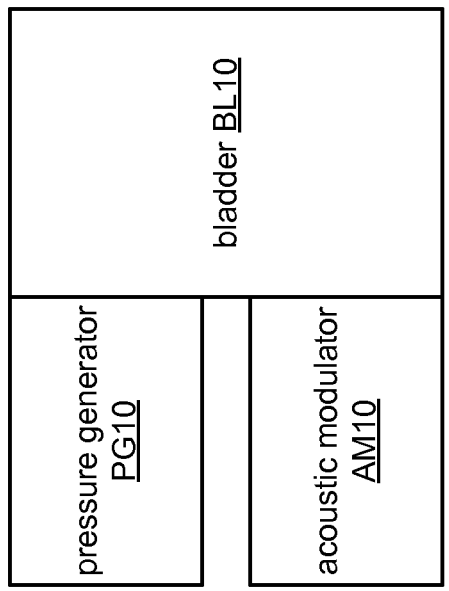
FIG. 1A shows a schematic diagram of a system S100 for debris removal according to a first configuration.

FIG. 1A shows a schematic diagram of a system S100 for debris removal according to a first configuration. System S100 includes a pressure generator PG10 that is arranged to pressurize a mass of air within a chamber CH10. For example, pressure generator PG10 may be configured to direct a pressurized stream of air into the chamber. Examples of pressure generator PG10 include an axial- or centrifugal-flow fan, blower, or compressor.

System S100 also includes an acoustic modulator AM10 that is arranged to modulate a pressure of the pressurized mass of air within chamber CH10. A surface that forms a top of chamber CH10 is elastic and is configured to oscillate in response to this air pressure modulation. In such manner, system S100 may be used to impart movement to solid matter (e.g., ice, snow, dust) on the top surface.

Figure 1B:
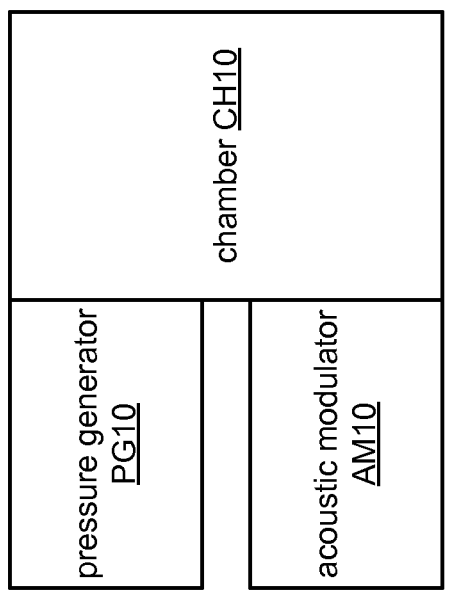
FIG. 1B shows a schematic diagram of another implementation of system S100.

In one example, chamber CH10 is formed by installing the top surface on top of an open box (e.g., bed of a dump truck or pickup truck). In such case, it may be desirable to provide a support over the cavity and under the surface to prevent accumulated debris from creating and concentrating into a depression in the cover. Such a support may include, at the top of the box, one or more ribs and/or a support surface made of expanded or perforated sheet metal (e.g., steel or aluminum). In another example as shown in FIG. 1B, chamber CH10 is a bladder BL10. Disclosures herein that relate to dimensions, properties (e.g., elasticity), and/or composition of a top surface of bladder BL10 are hereby expressly noted to disclose as well, and more generally, corresponding dimensions, properties, and/or composition of a cover of chamber CH10.

Acoustic modulator AM10 may be implemented as a bandpass enclosure (also called an acoustic bandpass filter). Such an enclosure is ported such that a mechanical wave created within the enclosure by an acoustic transducer is coupled to the exterior of the enclosure via a mass of air within the port. The mass of air within the port resonates in response to the pressure wave inside the enclosure. The frequency at which the box/port system resonates (also called the Helmholtz resonance) depends upon such factors as the effective length and cross-sectional area of the port, the internal volume of the enclosure, the air temperature, and the humidity of the air.

In a single-reflex bandpass enclosure (also called a fourth-order bandpass enclosure), the enclosure on one side of the transducer is sealed. As such an arrangement would impede the pressurized air from reaching that side of the transducer, a pressure imbalance on the transducer may result. Consequently, it may be desirable instead to configure the acoustic modulator as a dual-reflex bandpass enclosure (also called a sixth-order bandpass enclosure) or a triple-reflex bandpass enclosure (also called an eighth-order bandpass enclosure), as such a design allows the pressurized air (e.g., as produced by pressure generator PG10) to enter the enclosure on both sides of the transducer.

Figure 2C:
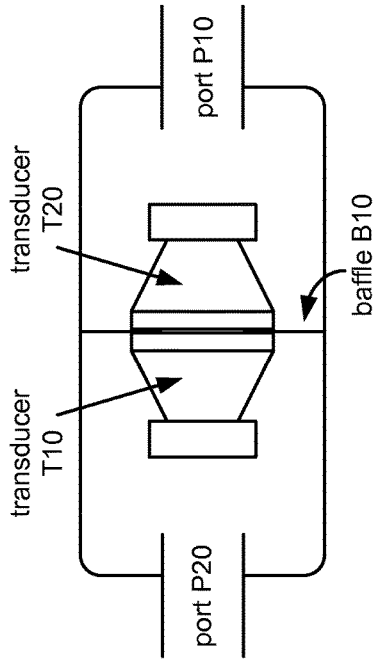
FIGS. 2A-3D show cross-sectional diagrams of implementations of acoustic modulator AM10 as a sixth-order bandpass enclosure.
Figure 2D:
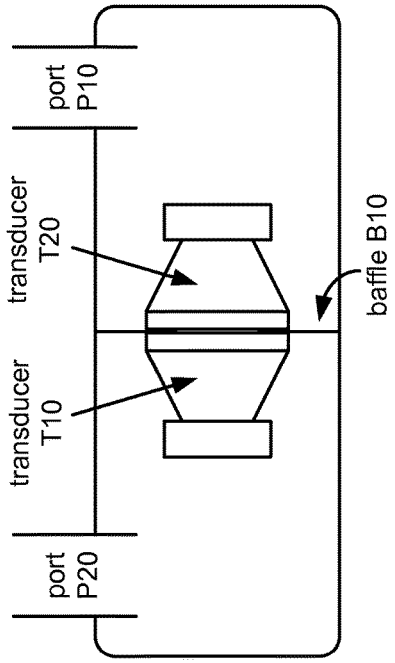
Figure 2A:
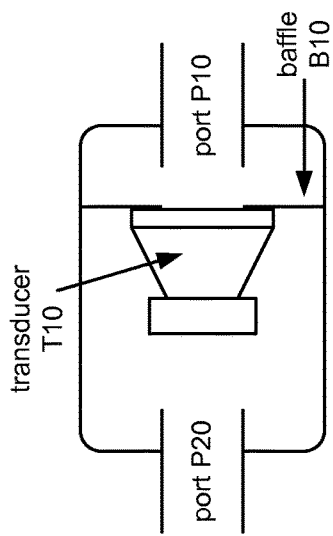

FIG. 2A shows a cross-sectional diagram of an implementation of acoustic modulator AM10 as a sixth-order bandpass enclosure in which the ports P10 and P20 are coaxial with the transducer T10. Transducer T10 is mounted (e.g., bolted, screwed, nailed, stapled, and/or glued or otherwise permanently or removably fastened) over a hole in baffle B10, which is a wall that divides the two ported chambers of the enclosure from one another. Baffle B10 may be made of a material (for example, wood, plastic, or an engineered wood product, such as particle board or medium-density fiberboard (MDF)) that is sufficiently stiff to support transducer T10 and to keep the non-moving parts of transducer T10 (e.g., the magnet and basket) from oscillating relative to the enclosure during operation of system S100. Baffle B10 may be bolted, screwed, nailed, stapled, and/or glued or otherwise permanently or removably attached to the interior wall of the enclosure. FIG. 7B shows an example of a circular implementation of baffle B10 that has a hole at least as large as the outer edge of surround S10 (the part of transducer T10 to which the diaphragm D10 of the transducer is mounted).

Figure 2B:
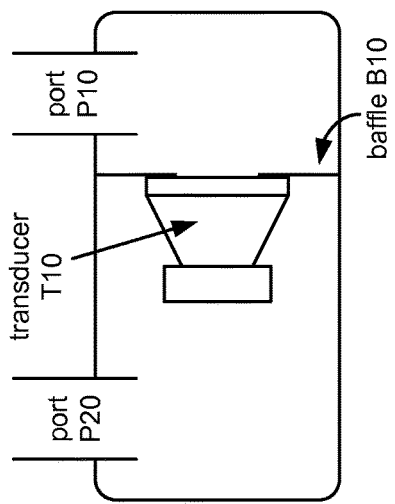
Figure 3A:
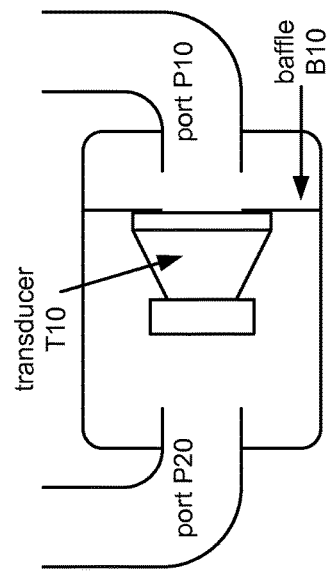
Figure 3C:
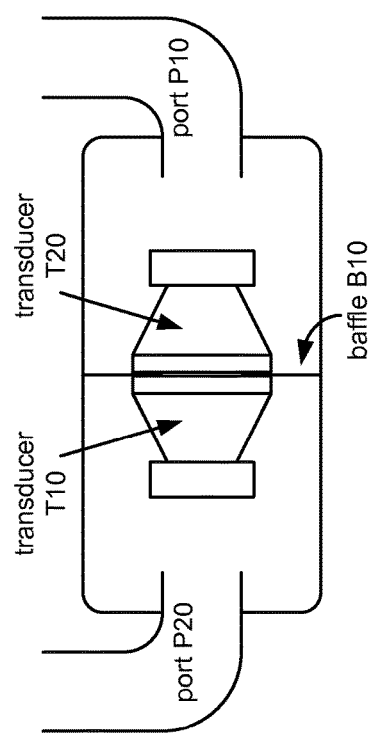
Figure 3B:
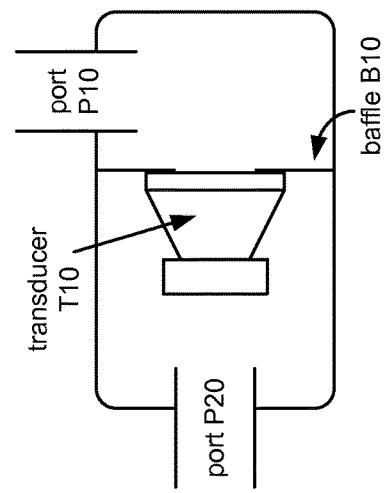
Figure 4B:
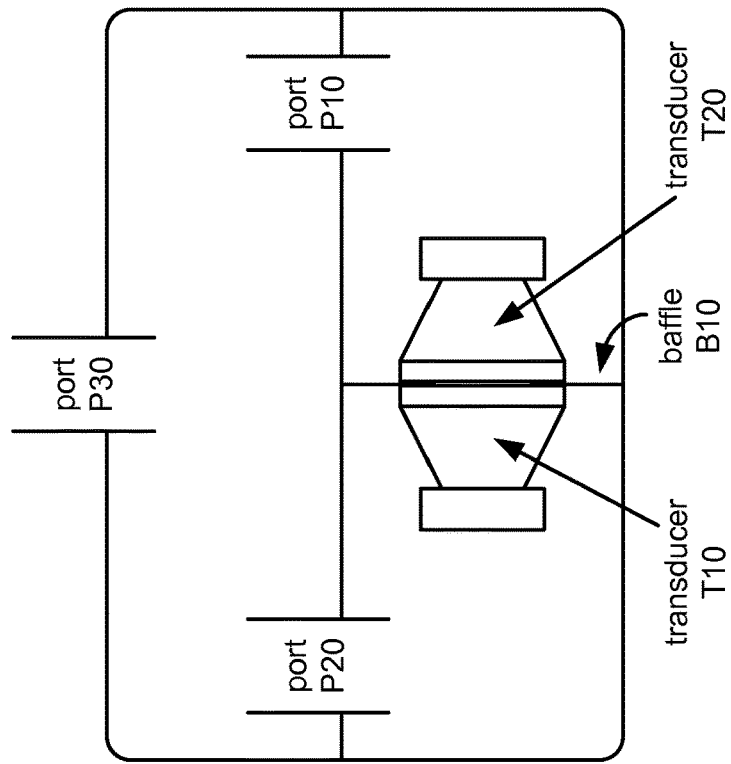
FIGS. 4A and 4B show cross-sectional diagrams of implementations of acoustic modulator AM10 as an eighth-order bandpass enclosure.
Figure 4A:
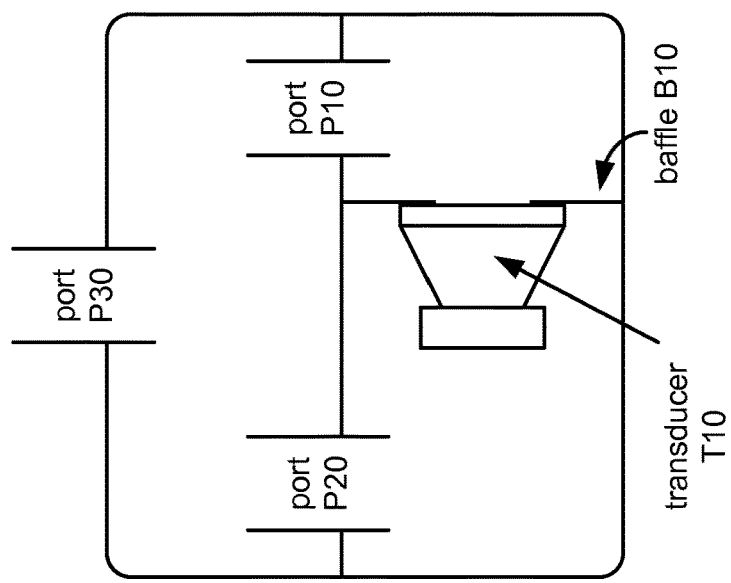

FIG. 2B shows a cross-sectional diagram of an implementation of acoustic modulator AM10 as a sixth-order bandpass enclosure in which the axes of ports P10 and P20 are orthogonal with the axis of transducer T10. FIG. 3A shows a cross-sectional diagram of an implementation of acoustic modulator AM10 as a sixth-order bandpass enclosure in which the axis of each of ports P10, P20 at its interior opening is orthogonal to the axis of the port at its exterior opening. FIG. 3B shows a cross-sectional diagram of an implementation of acoustic modulator AM10 as a sixth-order bandpass enclosure in which the axes of ports P10 and P20 are orthogonal to each other. FIG. 4A shows a cross-sectional diagram of an implementation of acoustic modulator AM10 as an eighth-order bandpass enclosure.

Transducer T10 may be implemented as a low-profile loudspeaker. Examples of a diameter of such a loudspeaker (e.g., the diaphragm diameter, or the overall diameter of the basket) include four, six, eight, ten, and twelve inches. Examples of an RMS power capacity of such a loudspeaker include 50, 100, 200, 250, 300, 400, 500, 750, and 1000 watts. Examples of a resonant frequency of such a loudspeaker include five, ten, fifteen, twenty, thirty, forty, fifty, and sixty Hertz. It may be desirable to add mass to a diaphragm (e.g., the cone) of the loudspeaker to lower its resonant frequency to a desired target resonant frequency. In one such example, a coating, such as a polymer coating, is applied to the diaphragm (e.g., in liquid form, such as brushed or sprayed on, and allowed to harden, dry, or otherwise become solid) to provide such additional mass.

In another example, acoustic modulator AM10 includes a bandpass enclosure having two instances T10, T20 of transducer T10 that are arranged to enclose a volume of air between their moving surfaces (e.g., diaphragms). In such an arrangement (commonly called an "isobaric" configuration), the transducers may be mounted cone-to-cone (also called a "clamshell" configuration, as shown e.g. in FIG. 2C), back-to-back (e.g., magnet-to-magnet), or cone-to-back (also called a "piggyback" configuration). An isobaric configuration may be used to obtain more output energy (e.g., a higher compressive force) from an enclosure of equal size, for example, or to provide the same compressive force with smaller transducers.

Figure 3D:
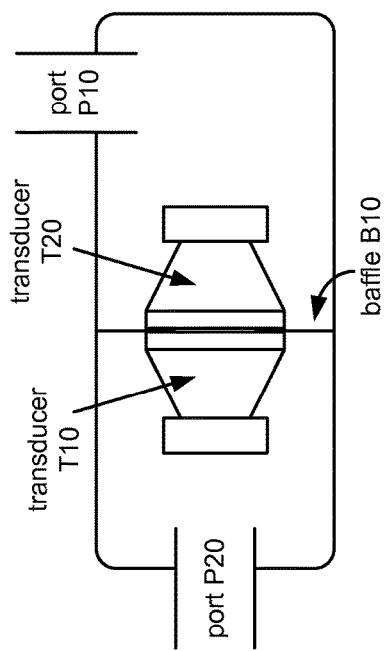

FIG. 2C shows a cross-sectional diagram of an implementation of acoustic modulator AM10 as a sixth-order bandpass enclosure having a pair of transducers T10, T20 mounted in an isobaric configuration in which the ports P10 and P20 are coaxial with the transducer pair. FIG. 2D shows a cross-sectional diagram of a similar implementation of acoustic modulator AM10 in which the axes of ports P10 and P20 are orthogonal with the axis of the pair of transducers. FIG. 3C shows a cross-sectional diagram of an implementation of acoustic modulator AM10 as a sixth-order bandpass enclosure having a pair of transducers T10, T20 mounted in an isobaric configuration in which the axis of each of ports P10, P20 at its interior opening is orthogonal to the axis of the port at its exterior opening. FIG. 3D shows a cross-sectional diagram of an implementation of acoustic modulator AM10 as a sixth-order bandpass enclosure having a pair of transducers T10, T20 mounted in an isobaric configuration in which the axes of ports P10 and P20 are orthogonal to each other. FIG. 4B shows a cross-sectional diagram of an implementation of acoustic modulator AM10 as an eighth-order bandpass enclosure having a pair of transducers T10, T20 mounted in an isobaric configuration.

For a cone-to-cone isobaric configuration, it may be desirable for baffle B10 to be thick enough to separate the cones by at least the maximum expected excursion. For some low-frequency transducers (also called "woofers"), the maximum expected cone excursion may be in the range of 5-7 centimeters (e.g., three inches), although the use of transducers having maximum excursions up to six or eight inches or even more is also possible. Because the cones move in the same direction relative to one another in such a configuration (e.g., being driven in-phase or out-of-phase as appropriate for the particular configuration), a separation equal to the maximum expected excursion is typically sufficient, and it is typically not necessary to separate the cones by double the maximum expected excursion.

Acoustic modulator AM10 may be implemented to include multiple bandpass enclosures, each containing one or more transducers. For example, acoustic modulator AM10 may be implemented to include two, three, four, or more bandpass enclosures, each containing one or more loudspeakers in ported chambers.

A bandpass enclosure of acoustic modulator AM10 may be implemented to have a cross-section that is circular (e.g., to be cylindrical) or a cross-section that is rectangular. (Other cross-sections, such as elliptical or a non-rectangular polygon, are also possible but may be more difficult to construct and/or to model e.g. for purposes of design, simulation, and/or tuning.) In one example, the body that defines the ported chambers is made of polyvinyl chloride (PVC) pipe (e.g., unplasticized PVC (UPVC) or chlorinated PVC (CPVC)). Such pipe is stiff, resistant to water and temperature, and readily available in many diameters (e.g., four, six, eight, ten, twelve inches) and lengths up to eight, ten, and twelve feet or more. Welding (e.g., radio-frequency (RF) or hot-air welding) and/or glue (e.g., solvent cement) may be used to assemble such pipe into a sturdy enclosure having joints that are watertight and airtight.

A particular example of such pipe is ten-inch-diameter PVC duct having an outer diameter of 10.75 inches, a wall thickness of 0.187 inches, and a weight of 3.83 pounds per foot. Such pipe has an upper temperature range of 140 degrees Fahrenheit and is available in Schedule 40 (heavy) or 80 (extra heavy).

Other examples of materials for constructing the body of a bandpass enclosure of acoustic modulator AM10 that are stiff and readily available in suitable diameters include pipe or tube made of one or more other types of plastic, such as HDPE (high-density polyethylene), and spiral-formed paper tube. The enclosure may be stuffed with a quantity of fibrous material, such as polyfill, or may be left empty of such material.

Likewise, the cross-section of a port of such a bandpass enclosure may be circular or rectangular (or elliptical or a non-rectangular polygon, which shapes may be more difficult to construct and/or to model e.g. for purposes of design, simulation, and/or tuning.) Particular examples of an interior diameter for a circular port cross-section include three, four, and five inches. Particular examples of interior dimensions for a rectangular port include a height of two, three, or four inches and a width of four, five or six inches.

Figure 5:
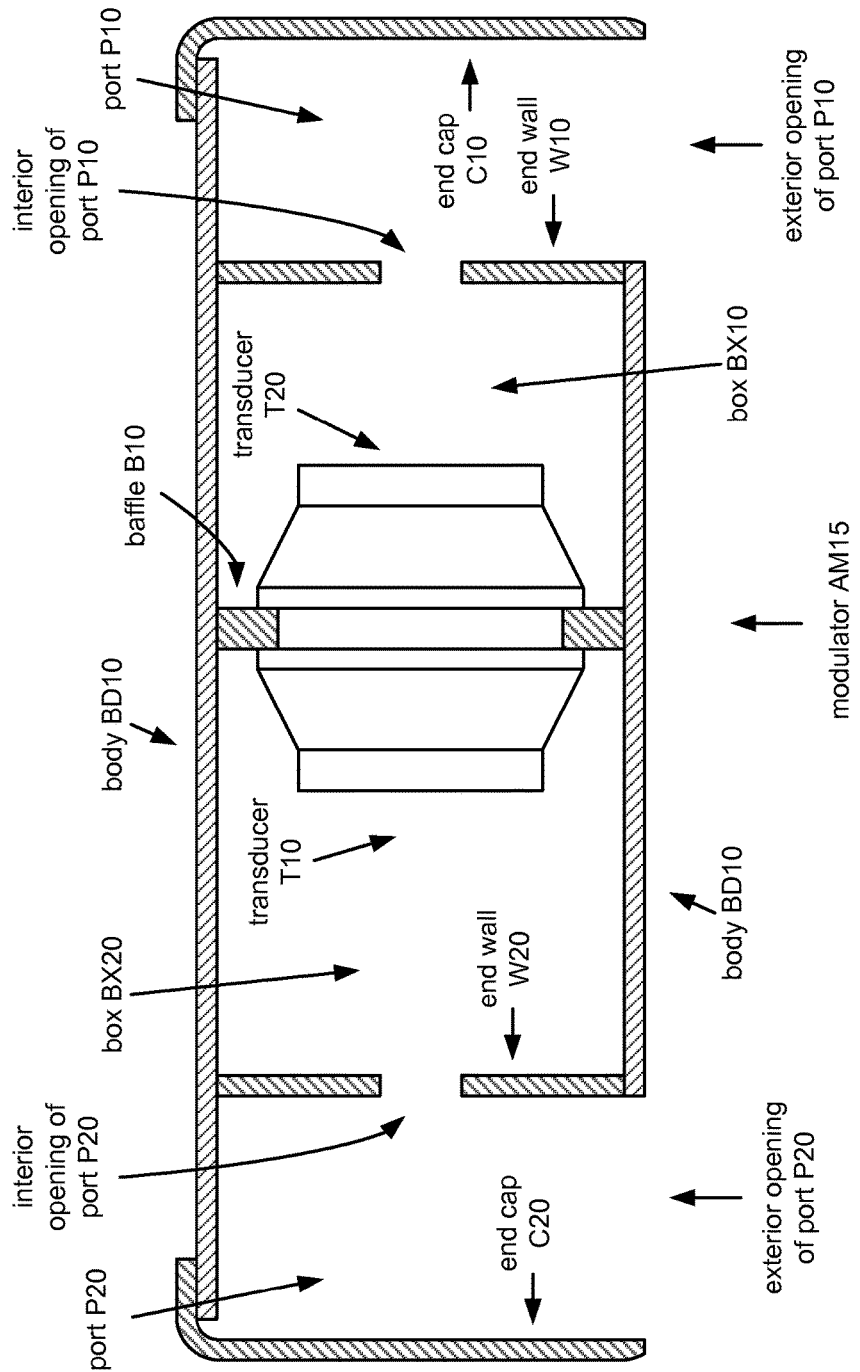
FIG. 5 shows a cross-sectional diagram of an implementation AM15 of acoustic modulator AM10 as a sixth-order bandpass enclosure.

FIG. 5 shows a cross-sectional diagram of an implementation AM15 of acoustic modulator AM10 as a sixth-order bandpass enclosure having a body BD10 made of PVC pipe that encloses a pair of transducers T10, T20 mounted in an isobaric configuration. An interior opening of each port P10, P20 is defined by a hole in a respective one of circular end walls W10, W20 (e.g., as shown in FIG. 7A), which may be made of wood, plastic (e.g., PVC), or an engineered wood product, such as particle board or medium-density fiberboard (MDF). Walls W10, W20 may be bolted, screwed, nailed, stapled, and/or glued or otherwise permanently or removably attached to the interior wall of body BD10.

Figure 6A:
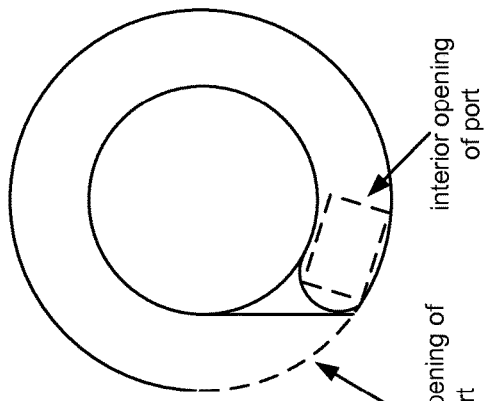
FIGS. 6A-6D show four examples of a side view of an implementation of port P10 or P20.

An exterior opening of each port P10, P20 may be defined by a cutout in body BD10 and/or in a respective one of end caps C10, C20 (e.g., as shown in FIG. 9). FIGS. 6A-6D show four examples of a side view of such a port in which the direction of airflow at the interior opening of the port is normal to the plane of the paper, and the direction of airflow at the exterior opening of the port is parallel to the plane of the paper (e.g., up and down). In the examples of FIGS. 6A and 6C, the port may be formed from a tube having one or more coils and a bend of about ninety degrees at its inner end. In one example, such a tube is completely rigid. In another example, the tube has at least one bellows section to permit the tube to be bent with respect to its axis while remaining rigid around its circumference. It may be desirable for the cross-sectional area of each port to remain substantially the same (e.g., within five, ten or twenty percent) from the entrance of the port to its exit. In an implementation as shown in FIG. 5, for example, each port may be a rectangular tube of substantially constant cross-section along its length. In such an example, the tube may be coiled such that its height is as illustrated at the interior opening and its width is as illustrated at the exterior opening.

Figure 6B:
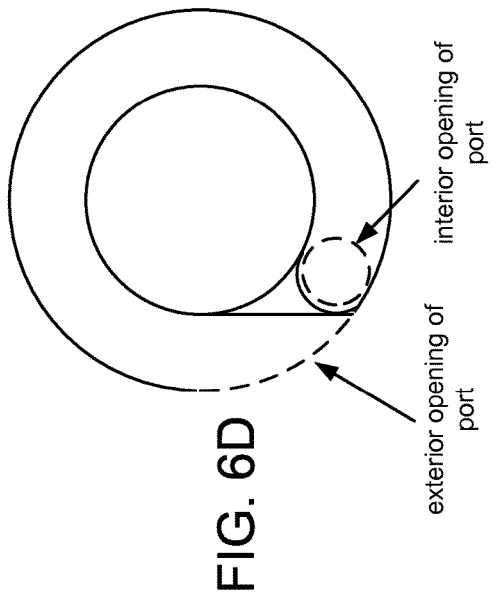
Figure 6C:
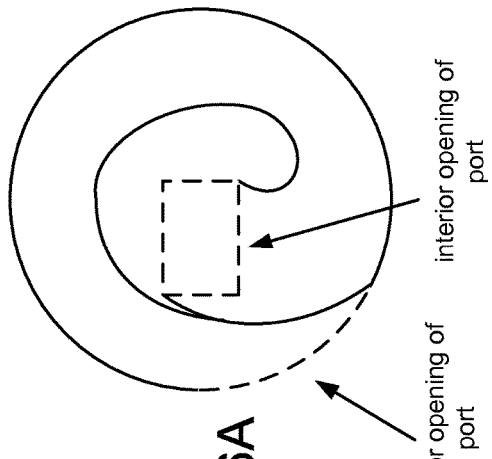
Figure 6D:
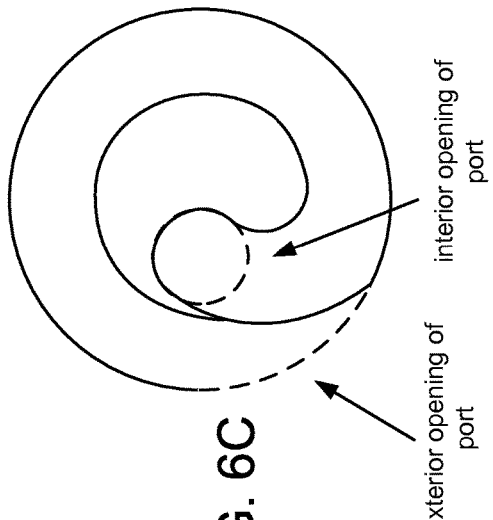
Figure 8:
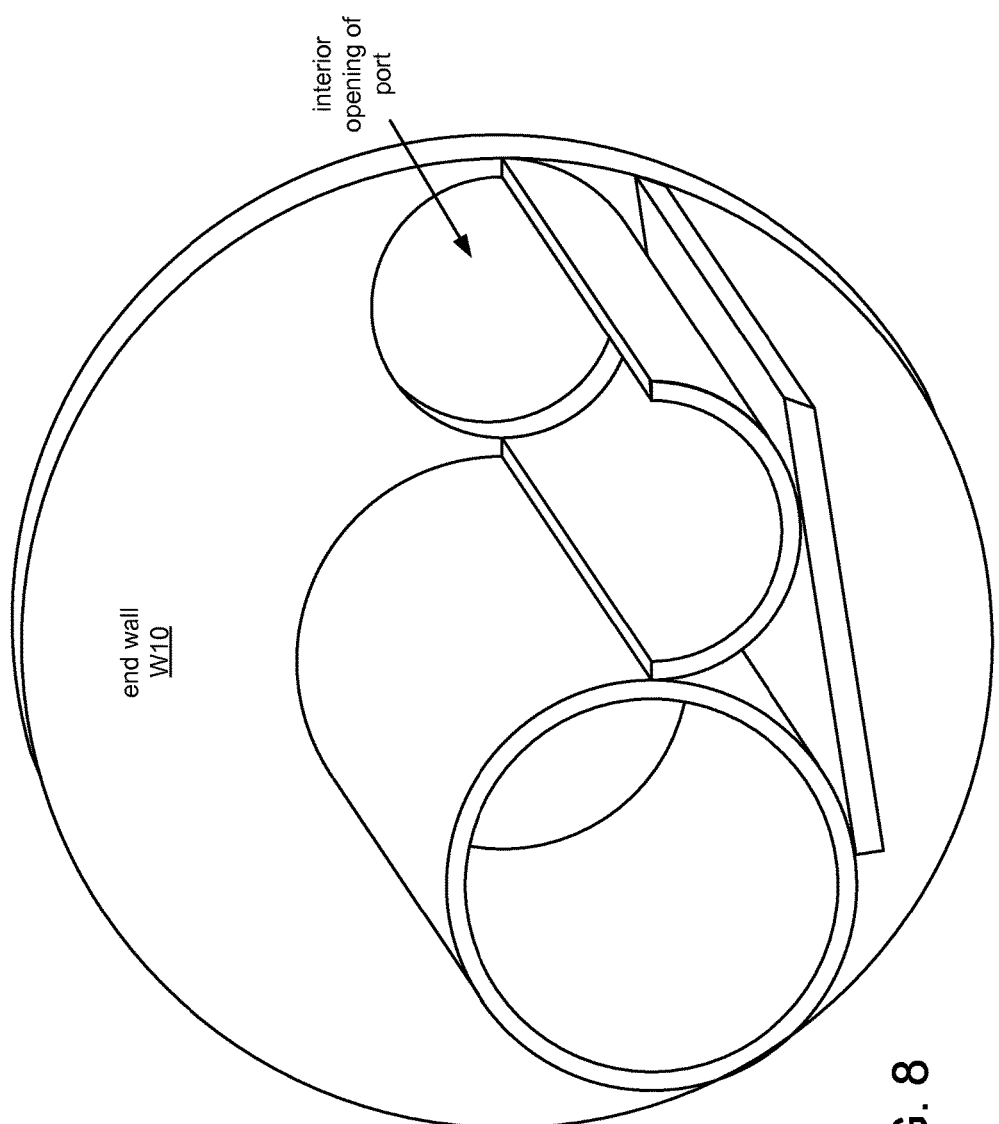

In the examples of FIGS. 6B and 6D, the port is formed as a coiled rectangular volume (with a rectangular entrance and a circular entrance, respectively). One surface of the port is defined by a surface of the corresponding one of end walls W10, W20, and the opposite surface is defined by the inner surface of the corresponding one of end caps C10, C20. Another surface of the port is defined by the inner surface of body BD10, and the opposite surface is defined by a half cylinder, a cylinder, and a planar plate as shown in FIG. 8. The half-cylinder and cylinder may be cut from tubes made of PVC or other plastic or paper, and the planar plate may be cut from PVC or other plastic, wood, or an engineered wood product (e.g., MDF). These pieces may be mounted to the end wall and/or to the end cap using glue and/or fasteners (e.g., screws and/or nails) and may be inserted into matching channels or slots in the end wall and/or end cap (e.g., as indicated by the dotted lines in FIG. 9). In one example, each of end caps C10, C20 is made of PVC and has a diameter of 10⅛ inches and a length of 1¹⁵⁄₁₆ inches. In another example, the surfaces of the port are defined at least in part by a structure produced using one or more additive manufacturing (also called "3D printing") techniques, such as extrusion deposition (also called "fused deposition modeling"), selective melting, selective sintering, and/or laminated object manufacturing.

Pressure generator PG10 may be implemented as a fan, a blower, or a compressor. Fans, blowers, and compressors are typically constructed according to the same principles, and the distinction among them is based on the pressure ratio that the device can achieve (i.e., between intake and discharge): the term "fan" indicates a pressure ratio of up to 1.1, the term "blower" indicates a pressure ratio of 1.1 to 1.2, and the term "compressor" indicates a pressure ratio higher than 1.2. Henceforth in this disclosure, the term "blower" is defined to include fans, blowers, and compressors.

In one example, pressure generator PG10 is implemented as a centrifugal-flow blower (e.g., a squirrel-cage blower), such that the direction of airflow at the intake is orthogonal to the direction of airflow at the discharge. In another example, pressure generator PG10 is implemented as an axial-flow blower, such that the direction of airflow is the same at the intake as at the discharge. It may be desirable for pressure generator PG10 to provide a high air flow rate (e.g., 100, 200, 250, 300, 400, 500, 600, 700, 800, or 1000 cubic feet per minute (cfm)) at low pressure (e.g., 0.25, 0.5, 0.75, 1, 2, 3, 4, or 5 pounds per square inch (psi)). Pressure generator PG10 may be provided with a filter at its intake (e.g., an automobile cabin air filter, or an internal combustion engine air filter). Use of such a filter, which may contain a paper, foam, or cotton filter element, may be desirable to block particulate matter from entering the intake.

Pressure generator PG10 may include an impeller that is belt-driven by an engine of the vehicle (e.g., an engine of the tractor unit that is connected to pull the trailer on which bladder BL10 is mounted). Alternatively, pressure generator PG10 may include an impeller that is driven by an electric motor (AC or DC, and having brushes or brushless commutation). For example, pressure generator PG10 may be implemented to include a direct-drive electric motor (e.g., a DC motor) such that the impeller is coaxially mounted to the motor shaft. In one such example, pressure generator PG10 is implemented as an electric supercharger as described in U.S. Pat. No. 6,328,024 B1 (issued Dec. 11, 2004 to Kibort). This supercharger is described as an axial flow compressor having rotating impeller blades that is powered by an electric motor (brush or brushless commutation) and is capable of achieving a speed of 20,000-21,000 revolutions per minute (rpm), at a current draw of about forty amperes at twelve volts, to provide approximately ½ psi at a flow rate of about 500 cfm.

Figure 10A:
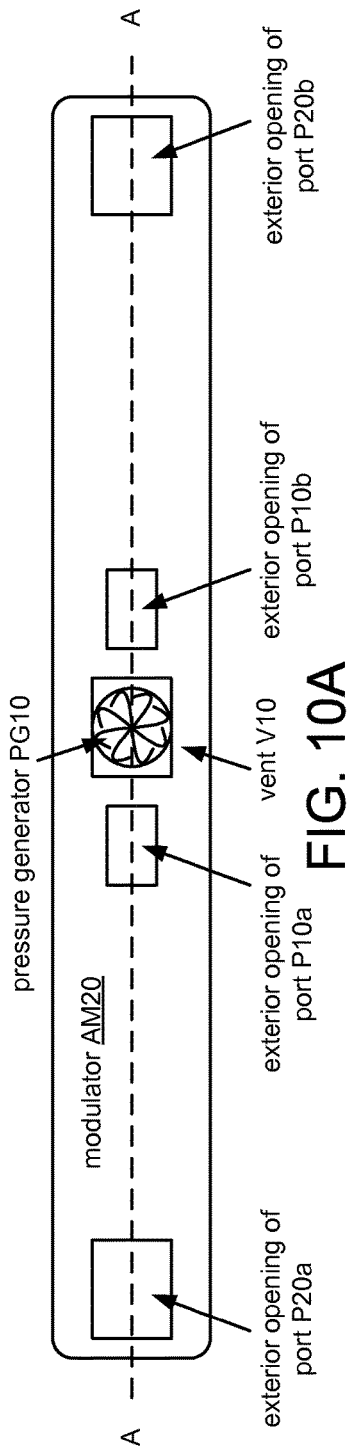
FIGS. 10A and 10B show front and cross-sectional views, respectively, of an implementation AM20 of acoustic modulator AM10.
Figure 10B:
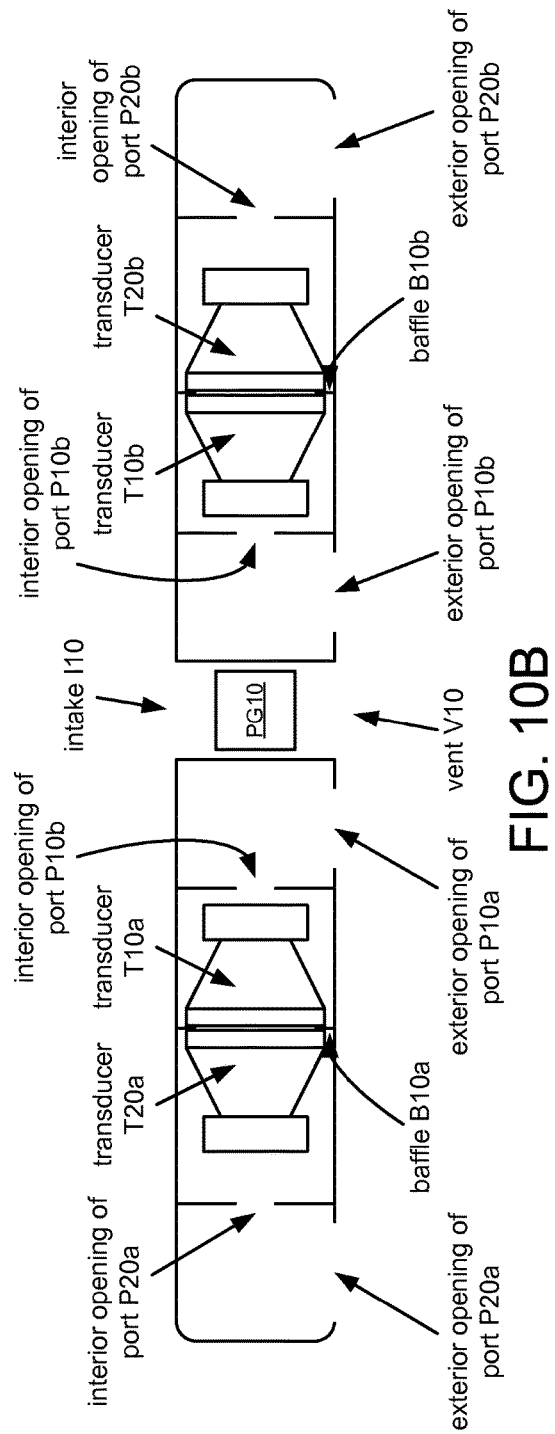

It may also be desirable to implement pressure generator PG10 to be small enough to be mounted to or even within acoustic modulator AM10. For example, an implementation of pressure generator PG10 as an axial-flow blower having an integrated electric motor (e.g., as described above and/or in U.S. Pat. No. 6,328,024 B1) may have a diameter as small as three, four, five, six, seven, eight, nine, ten, or twelve inches and a length as small as four, five, six, seven, eight, nine, ten, or twelve inches. FIGS. 10A and 10B show front and cross-sectional views, respectively, of an implementation AM20 of acoustic modulator AM10 in which such an implementation of pressure generator PG10 is mounted in a channel of the modulator (e.g., of circular or rectangular cross-section) between two instances of acoustic modulator AM15. In such an implementation, it may be desired to use the same transducer drive signal to drive all instances of acoustic modulator AM15.

In the example of FIGS. 10A-B, the blower channel is between two bandpass enclosures (e.g., each as described herein with reference to FIG. 5, where the interior end caps are replaced by end walls such that the two enclosures share a long common body BD10). This channel is acoustically separate from the bandpass enclosures, such that the discharge of pressure generator PG10 passes into the bladder without coming into contact with any air inside the bandpass enclosures. Pressure generator PG10 and the bandpass enclosures of acoustic modulator AM20 only share a common chamber within the bladder, such that the pressurized air discharged by pressure generator PG10 will pressurize the bladder and eventually flow into acoustic modulator AM20 such that the steady-state pressure is equalized throughout the system.

An arrangement as shown in FIGS. 10A-B may provide for easy installation, removal, and storage of the system by allowing the bladder to be rolled around a single tubular assembly (which may be, for example, cylindrical or rectangular in cross-section) when the system is not in use. FIG. 11A shows a top view of such an arrangement as installed (e.g., on the top surface of a vehicle, shipping container, trailer, or semi-trailer), and FIG. 11B shows a side view of the system ready for removal or storage. As shown in FIG. 11A, acoustic modulator AM10 (e.g., AM20) may be implemented to have a length equal to a width of bladder BL10 (e.g., eight or 8½ feet, as described in the example below).

It may be desirable to configure system S100 for installation on the top surface of a semi-trailer. FIG. 12A shows a top view of an example of bladder BL10 for such use with a semi-trailer whose top surface has a width of eight-and-one-half feet (102 inches) and a length of fifty-three feet. Other standard widths for a semi-trailer include eight feet, and other standard lengths for a semi-trailer include 27.25, 28, 32, 34, 36, 40, 44.125, 45, 47.25, 48, and 52 feet. FIGS. 12B and 12C show rear views of such an example of bladder BL10 as installed on a semi-trailer T100 of standard height 13½ feet, in which bladder BL10 is shown before and during inflation, respectively. FIGS. 13A and 13B show side views of such an installation (including acoustic modulator AM10) before and during inflation, respectively. In another example, acoustic modulator AM10 and bladder BL10 may be implemented to have a length and width, respectively, that are slightly less (e.g., six or twelve inches) than the corresponding dimensions of the surface upon which the system is installed. In a further example, bladder BL10 may be implemented to overhang one or more sides of the surface upon which it is installed (e.g., to have a lip that overhangs the sides and/or rear of the surface). In such case, the overhanging portion may be used to secure bladder BL10 in place. For example, the overhanging portion may be tied, clipped, or otherwise fastened to the respective sides of the vehicle (e.g., trailer) upon which bladder BL10 is mounted.

At least a top surface of bladder BL10 is sufficiently elastic to oscillate in response to pressure modulation by acoustic modulator AM10 of the enclosed air mass. The term "elastic" is used to indicate a solid material that may be forcibly elongated by at least five, ten, twenty-five, fifty, or one hundred percent of its original length and that returns to its original dimensions after removal of the pull force. Bladder BL10 may be constructed from one or more sheets of thermosetting or thermoplastic elastomeric material, such as any one or more of the following elastomers:

A) rubber, such as any of the following: natural or synthetic gum rubber, styrene butadiene rubber (SBR), butyl rubber (a copolymer of isobutylene with isoprene), nitrile rubber (also called Buna-N rubber, a copolymer of butadiene and acrylonitrile), EPDM rubber (ethylene propylene diene monomer), Santoprene® (cross-linked EPDM rubber and polypropylene), silicone rubber;

B) neoprene (polymerized chloroprene);

C) Viton® fluoroelastomer, which has good resistance to petroleum products;

D) Hypalon® (chlorosulfonated polyethylene).

It is common to refer to any of the materials set forth in A)-D) above as a "rubber". Unless otherwise indicated, the term "rubber" is henceforth used as a synonym for "elastomer".

Selection among sheet elastomers for constructing bladder BL10 may be made according to such factors as resistance to cold temperatures, sunlight, abrasion, puncture, water, and/or petroleum products. Nitrile has better resistance to petroleum products and may be reinforced with nylon cloth. EPDM rubber may be cloth-reinforced, may be anti-slip/anti-skid textured, and is available in thicknesses of 45 mil, 60 mil, and 90 mil. Neoprene has moderate resistance to petroleum products and sunlight, is flame-resistant and does not support combustion, has a useful temperature range of from −40 to +275 degrees Fahrenheit, may be reinforced with fiberglass cloth, and may be anti-slip/anti-skid textured. Hypalon® has excellent resistance to weather, oil, and grease and excellent abrasion resistance and tensile strength, is flame-resistant, and has a useful temperature range of from −67 to +320 degrees Fahrenheit. Another factor is cost, of course, which varies among these examples of sheet elastomer.

Examples of thickness of a wall of bladder BL10 include 30, 45, 50, 60, 75, 90, 100, 120, 150, 200, and 250 mil (i.e., inches/1000). Examples of a maximum thickness of bladder BL10 when fully inflated (i.e., in a direction normal to the vehicle surface) include four, six, nine, twelve, eighteen, 24, 30 and 36 inches.

It may be desirable to treat at least the top surface of bladder BL10 by application of a parylene coating (e.g., for increased protection from the environment) or application of a film of Teflon® (polytetrafluoroethylene) (e.g., a pre-etched Teflon® film) or another non-stick material.

As shown in the crosswise cross-sectional view of FIG. 14A, bladder BL10 may be constructed from a sheet of a selected elastomer by using a lap joint (e.g., made with adhesive and/or heat) to bond the lateral edges of the sheet to one another along the length of the sheet to form a cylinder. FIGS. 14B-14E show lengthwise cross-sectional views of various examples of then using adhesive to create a seal at one end of this cylinder to form the distal end of bladder BL10 (i.e., the end opposite acoustic modulator AM10). (It is noted that FIG. 14B shows a lap joint as may be used along the length of the sheet as discussed herein with reference to FIG. 14A.)

It is also possible to construct bladder BL10 from two separate sheets of elastomer, as shown in the crosswise cross-sectional view of FIG. 14F. In such case, the two sheets may be the same or may have one or more different characteristics, and may be made of the same or different materials. For example, the top surface S10 may be more elastic than the bottom surface and/or have a non-stick film applied, and/or the bottom surface may be textured to reduce slippage relative to the vehicle surface and/or may be more abrasion- and/or puncture-resistant (e.g., may be thicker and/or reinforced, such as with nylon or fiberglass cloth). It is also possible for the outer layer of bottom surface S20 in such an implementation of bladder BL10 to be non-elastic or even rigid. In general, bottom surface S20 may be constructed from any material having properties desired for a particular application that is also capable of forming a sufficiently airtight seal with top surface S10 to allow a desired pressure to be achieved within the chamber and an acoustic modulation of the pressurized air within the chamber to be performed to induce oscillation of top surface S10.

Figure 17A:
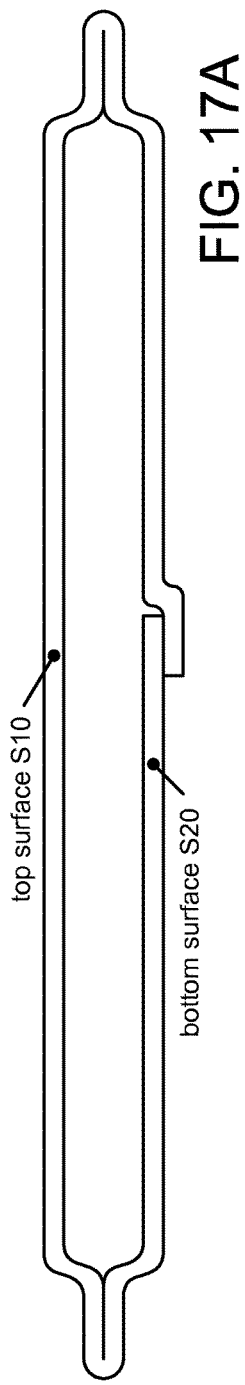
FIG. 17A shows a crosswise cross-sectional view of an example of a single-sheet implementation of bladder BL10.

It may be desirable to removably fasten bladder BL10 to the vehicle surface before use (e.g., using clips, hooks, loops, hasps, and/or other disengageable retainers). For example, it may be desirable to mount grommets (e.g., of brass) along the sides and/or the distal end of bladder BL10 that may be used to secure the bladder to the vehicle surface during use. FIG. 17A shows a crosswise cross-sectional view of an example of a single-sheet implementation of bladder BL10 in which seals are formed (e.g., by heat and/or adhesive) along the sides of the bladder to allow holes for such grommets to be made along the perimeter of the bladder without affecting its airtightness. It may be desirable to provide the vehicle with removable and/or permanently fixed fasteners and/or mounts to which such grommets or other retaining features of bladder BL10 may be secured. A cowling or other air-deflecting structure may be provided at a leading edge of the cover or bladder BL10, such that the cover or bladder may remain securely in place at highway speeds.

A leading edge of the cover or of bladder BL10 may include handles, and/or other features (e.g., holes) via which rope or cable may be attached, such that the cover or bladder BL10 may be pulled (e.g., winched) into place. A roller or other friction-reducing feature may be provided at a rear edge of the vehicle (e.g., trailer) over which the cover or bladder BL10 is to be pulled.

It may be desirable to provide a liner under a bottom surface of bladder BL10 (e.g., a sheet of UHMW-PE (ultra-high-molecular-weight polyethylene) or other abrasion-resistant material). Such a liner may protect against puncture of the bladder in case, for example, the ceiling of the trailer is pierced during loading or unloading of the trailer. The liner may be integrated with the bladder (e.g., attached thereto as a bottom layer) or may be separate from or separable from (i.e. removably attached to) the bladder. Alternatively, the liner may be attached to the bladder along only one end (e.g., along the leading edge or along the trailing edge of the bladder) so that for storage, the bladder can first be rolled up alone, and the liner sheet can then be rolled around the rolled-up bladder. Such separate rolling may produce a package for storing that has a smaller radius than if the bladder and liner sheet were rolled up together as a single layer, especially for a case in which the bladder is considerably more flexible than the liner.

As shown in FIG. 15C, it may be desirable to use a stitching element ST10 (e.g., a single- or multi-stranded line, thread, string, or yarn) to create and/or reinforce any or all of the seals at the end or sides of bladder BL10 as described herein.

Oscillation of the top surface of bladder BL10 imparts movement to debris that has accumulated on this surface. It may be desirable for bladder BL10 to have a domed profile along its length when inflated (e.g., as shown in FIG. 12C), such that the highest part of the inflated bladder is along the central line of its top surface. Such a profile creates a downward gradient at each other point on the surface, allowing the perturbed debris (e.g., snow) to flow downward and away from the vehicle top surface. Such deformation of the top surface of bladder BL10 may also help to break up any layer of ice that has formed on this surface, contributing to easier removal of such debris as well. The tendency to form a dome may be enhanced by constructing top surface S10 of bladder BL10 to be more elastic than bottom surface S20 (e.g., for bottom surface S20 to have a Young's modulus in the elastic region of at least two, five, or ten times that of top surface S10 in the elastic region). For example, bottom surface S20 may be flexible but non-elastic, or even rigid (e.g., may have a Young's modulus in the elastic region of more than 0.5 GPa).

Bladder BL10 is inflated at its open end by pressure generator PG10. Modulation by acoustic modulator AM10 of the pressure of the air mass within the inflated bladder may occur from this end as well. FIG. 15A shows a front view of a mount MT10 that may be used to secure the open end of bladder BL10 to acoustic modulator AM10 (e.g., to acoustic modulator AM20 as shown in FIGS. 10A-B). Mount MT10 is implemented as a long block that is removably fixed (e.g., bolted) or permanently fixed to the body BD10 of the modulator and provides a neck over which the open end of bladder BL10 may be slipped and to which this open end may be secured. Mount MT10 may be provided with a flange F10 as shown to enhance retention of the bladder. It may be desirable to fold over the edge of the open end of bladder BL10 and to glue and/or sew this edge to form a lip (e.g., for better retention to the mount and/or to increase durability).

FIG. 16B shows a cross-wise cross-sectional view of bladder BL10 as attached to modulator AM10 via mount MT10. In this example, bladder BL10 is secured by a clamp CL10, which may be implemented as a large oval hose clamp (e.g., as shown in FIG. 16A, with bladder BL10 not explicitly shown) or as a band clamp. FIG. 16B also shows a pair of a set of bolts and nuts that may be used to attach mount MT10 to the body of the modulator, with spacers to match the curved surface of body BD10 to the flat undersurfaces of the bolt heads. FIG. 16B also shows how mount MT10 may be configured to extend the effective acoustic length of the ports that pass through it.

Since mount MT10 may be up to eight feet long or more, it may be desirable to form the mount in multiple pieces (e.g., two matching halves, as indicated by the center vertical line in FIG. 15A) that may be installed to form the complete mounting surface. Once the air enters the bladder it is open to one large chamber, so as soon as it exits the blower port and acoustic ports it can merge into the large bladder chamber. Bladder BL10 may remain attached to the acoustic modulator (e.g., to mount MT10) or be removed for de-installation or storage of the system.

The interior of mount MT10 may be solid or hollow. If the interior is hollow (e.g., to reduce weight and/or materials cost), it may be desirable to include stiffening members (e.g., SM10 as shown in the cross-sectional view of FIG. 15B) to counteract any droop of the long top and/or bottom surfaces that mate with bladder BL10 and/or to resist the compressive force of the clamp that secures the bladder, such that a good seal with the open end of the bladder can be maintained throughout an extended period of service.

Figure 17B:
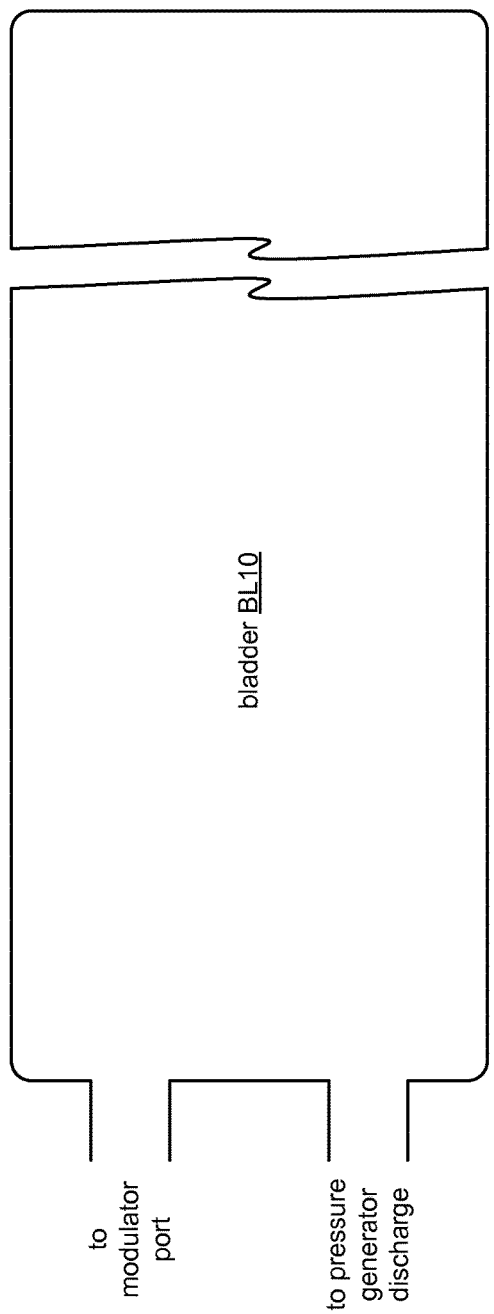
FIGS. 17B and 18 show top views of two examples of necked implementations of bladder BL10.
Figure 18:
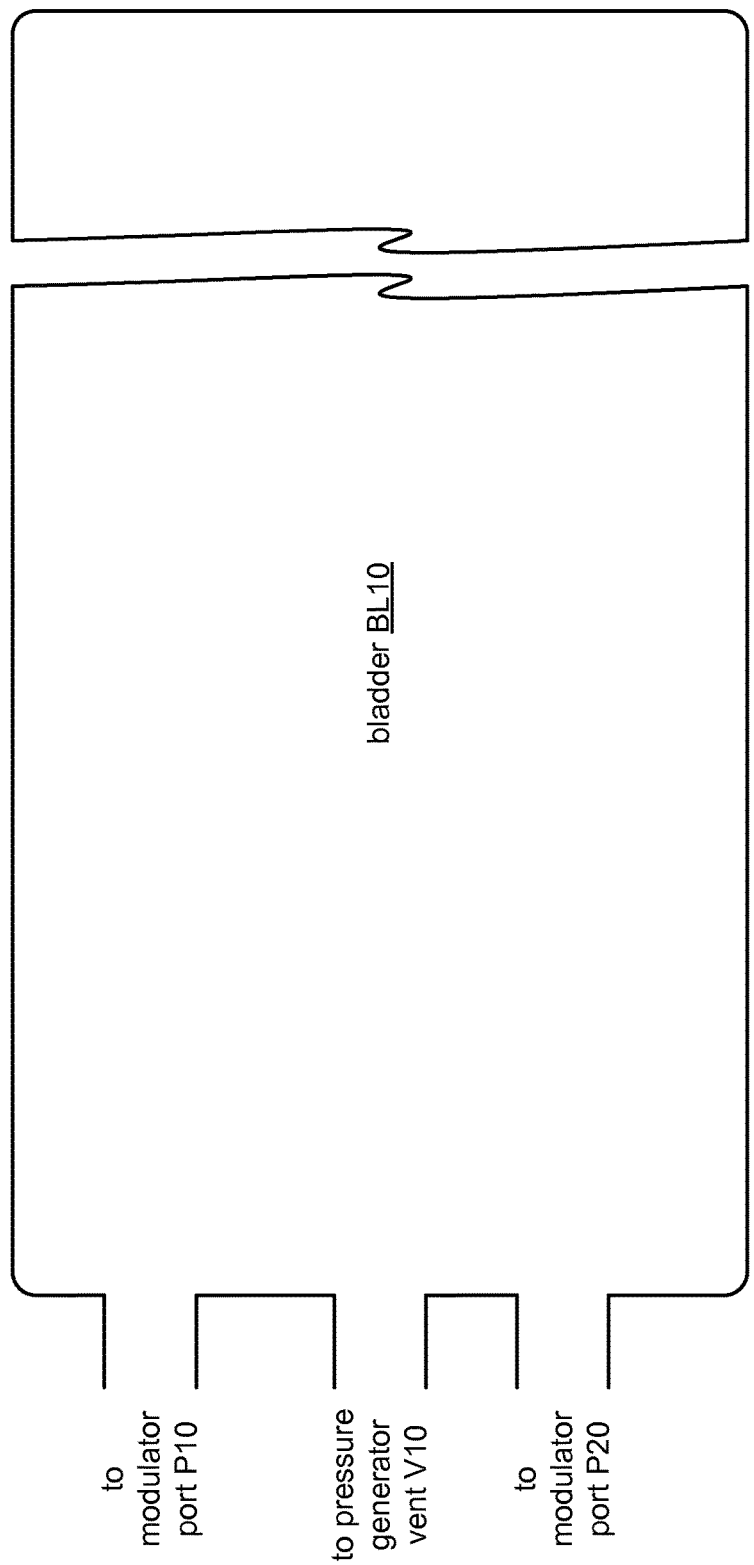

In addition to potentially reduced fabrication costs, a bladder that is formed to have a wide mouth may allow for a worker to apply a patch to the interior of the bladder in case repair of a puncture or other leak is required. In another example, the open end of bladder BL10 may be formed into necks to receive the discharge of pressure generator PG10 and to mate with the ports of acoustic modulator AM10. In such case, it is possible that pressure generator PG10 and acoustic modulator AM10 are not assembled into a single unit (e.g., a single unit as described herein with reference to modulator AM20). It is even possible for the discharge to enter at one end or side of bladder BL10 and for the ports of modulator AM20 to connect to the enclosed air mass at one or more different sides of bladder BL10 (e.g., discharge at one end of bladder BL10 and ports at the other end). FIGS. 17B and 18 show top views of two examples of bladder BL10 in which the open end is formed into necks (e.g., by gluing, welding, and/or sewing), which may be mounted to the respective ports and vents using, for example, hose clamps and/or band clamps.

Figure 19:
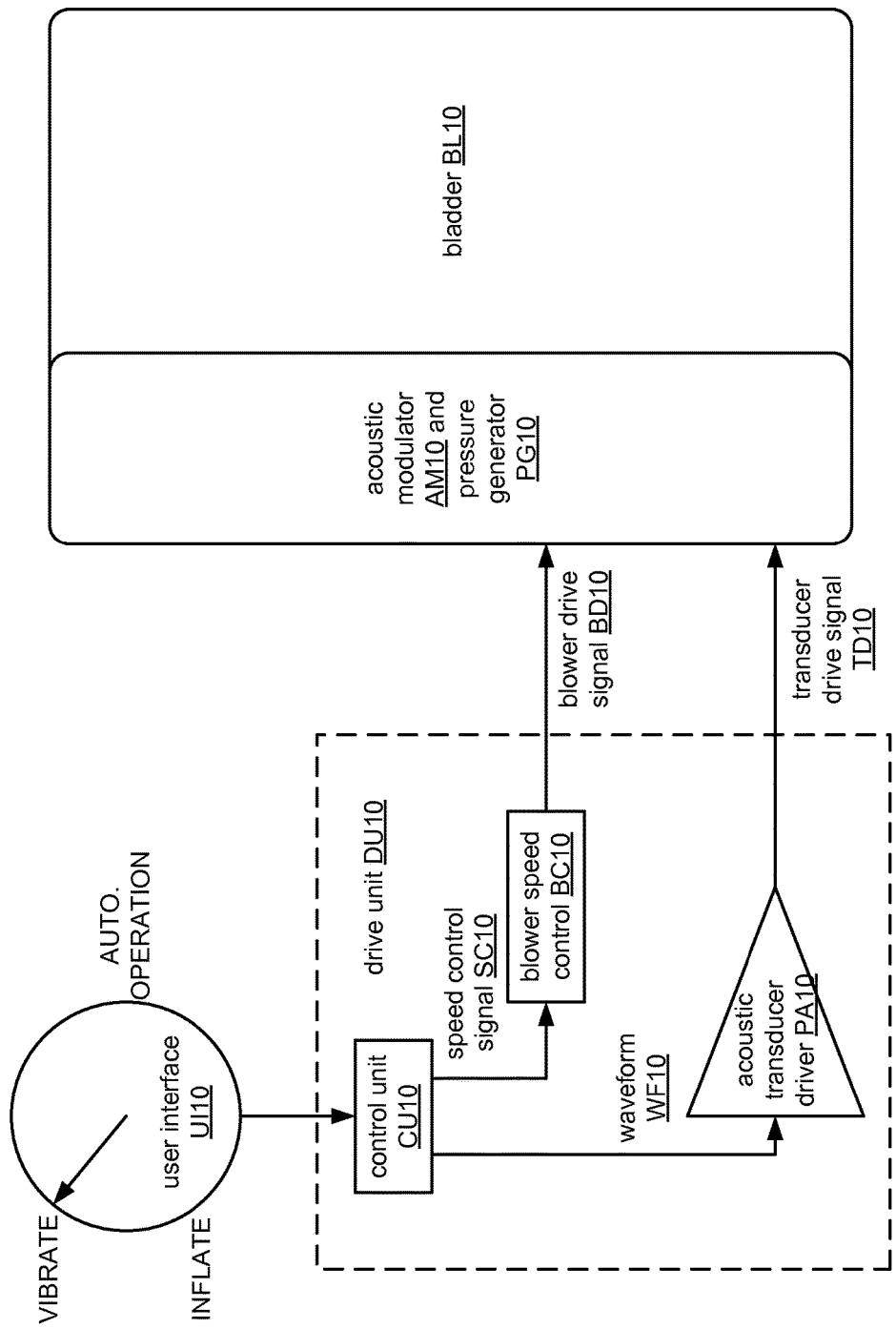
FIG. 19 shows a diagram of control flow for implementations of system S100 as described herein.

FIG. 19 shows a diagram of control flow for implementations of system S100 as described herein. A user may control the system manually by initiating inflation of bladder BL10 (via a user interface UI10, such as a control switch or touchscreen). In response to this indication, a drive unit DU10 supplies power to pressure generator PG10 to inflate bladder BL10 (e.g., to a pressure of one-half to one psi). In this mode, any layers of ice that may have formed on the top surface of the bladder are broken up. In this example, in response to the indication a control unit CU10 provides a speed control signal SC10 to a blower speed control BC10, which provides a blower drive signal BD10 to pressure generator PG10. In one example, control unit CU10 provides a control voltage or frequency to blower speed control BC10, which produces blower drive signal BD10 in response to the control signal as a pulse-width-modulated (PWM) signal.

Once bladder BL10 is inflated, the user initiates a vibration mode, in which the pressure is maintained while the transducers of acoustic modulator AM10 are driven (e.g., by a high-power audio amplifier with a low-frequency oscillator at its input) to modulate the pressurized air mass. Examples of the frequency of the low-frequency oscillator include five, ten, fifteen, twenty, twenty-five, thirty, forty, and fifty Hertz. For example, the frequency of the low-frequency oscillator may be selected to be substantially the same as (e.g., within five, ten, or twenty percent of) the resonant frequency of the loudspeaker being driven. In this vibration mode, oscillation of the top surface imparts movement to the debris, which falls downward and off of the surface. Alternatively, an automatic mode of operation may be selected such that a control unit CU10 (e.g., to control actuation and timing of the inflation and vibration modes) causes drive unit DU10 to perform the inflation-vibration sequence automatically. FIG. 19 shows an example in which control unit CU10 generates a signal WF10 having the desired frequency and shape to an acoustic transducer driver PA10 (e.g., a power amplifier), which amplifies signal WF10 to produce transducer drive signal TD10.

Several examples of transducer driving power (e.g., 500-1000 W) and frequency (e.g., 5-20 Hz) and motor power consumption (e.g., 500 W) are given above. A total draw of a typical implementation of system S100 may be as high as 2-3 kilowatts. A typical battery system of a tractor for hauling semi-trailers includes multiple (e.g., four) 12V batteries in parallel and can handle a short-term current draw as high as 500-2000 amperes. Accordingly, such a battery system is well-equipped to provide sufficient power to operate system S100 over a debris removal cycle of several minutes. In such case, it may be desired to operate system S100 when the engine of the tractor is also operating, so that the power drawn by system S100 may be replenished by power from the alternator. In another example, system S100 is driven by a portable electric generator, which may be powered by gasoline or diesel fuel.

Figure 25:
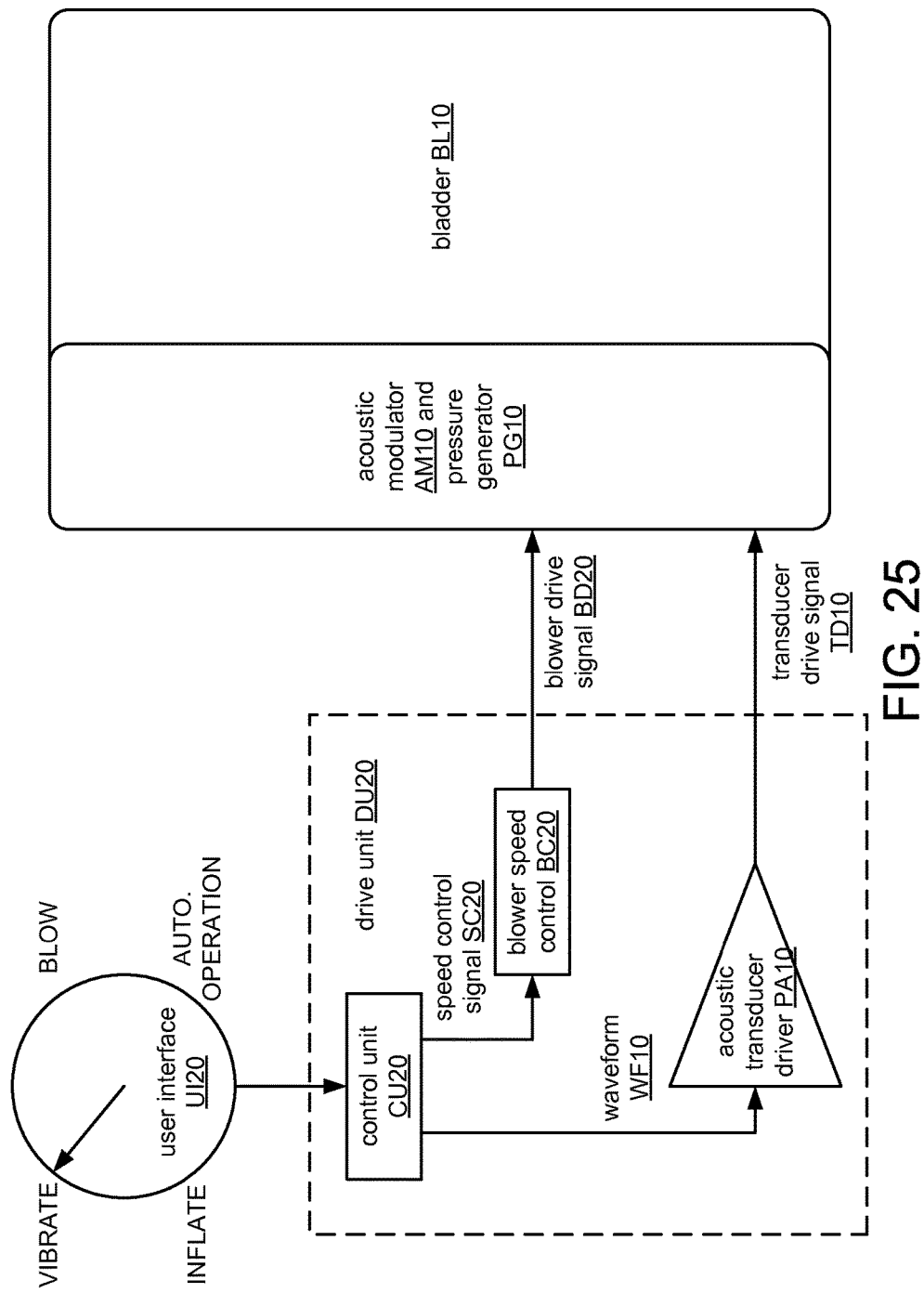
FIG. 25 shows a diagram of control flow for implementations of system S100 as described herein that includes a blowing mode.

It may be desired to provide an additional mode of operation to blow the loosened debris from the top surface of bladder BL10. In one example, the top surface of bladder BL10 is provided with several one-way valves (e.g., at a spacing of one or two feet from one another) that open outward only when the pressure within bladder BL10 is increased above the pressure used for inflation and vibration. For example, this blowing mode may include pulsing pressure generator PG10 to provide spikes (of length one-half, one, or two seconds) of higher air pressure (e.g., double the pressure supplied during vibration, or two or three psi). FIG. 25 shows a diagram of control flow for an implementation of system S100 as described herein that includes a blowing mode for providing such pulsed pressure after inflation and vibration and corresponding implementations UI20 and CU20 of user interface UI10 and control unit CU10, respectively. In this example, control unit CU20 is configured to select among multiple blower speed control modes for operation in inflate/vibrate or blowing mode, respectively, and to provide a corresponding implementation SC20 of speed control signal SC10 to an implementation BC20 of blower speed control BC20, which produces in response a corresponding implementation BD20 of blower drive signal BD10 to pressure generator PG10.

Figure 20:
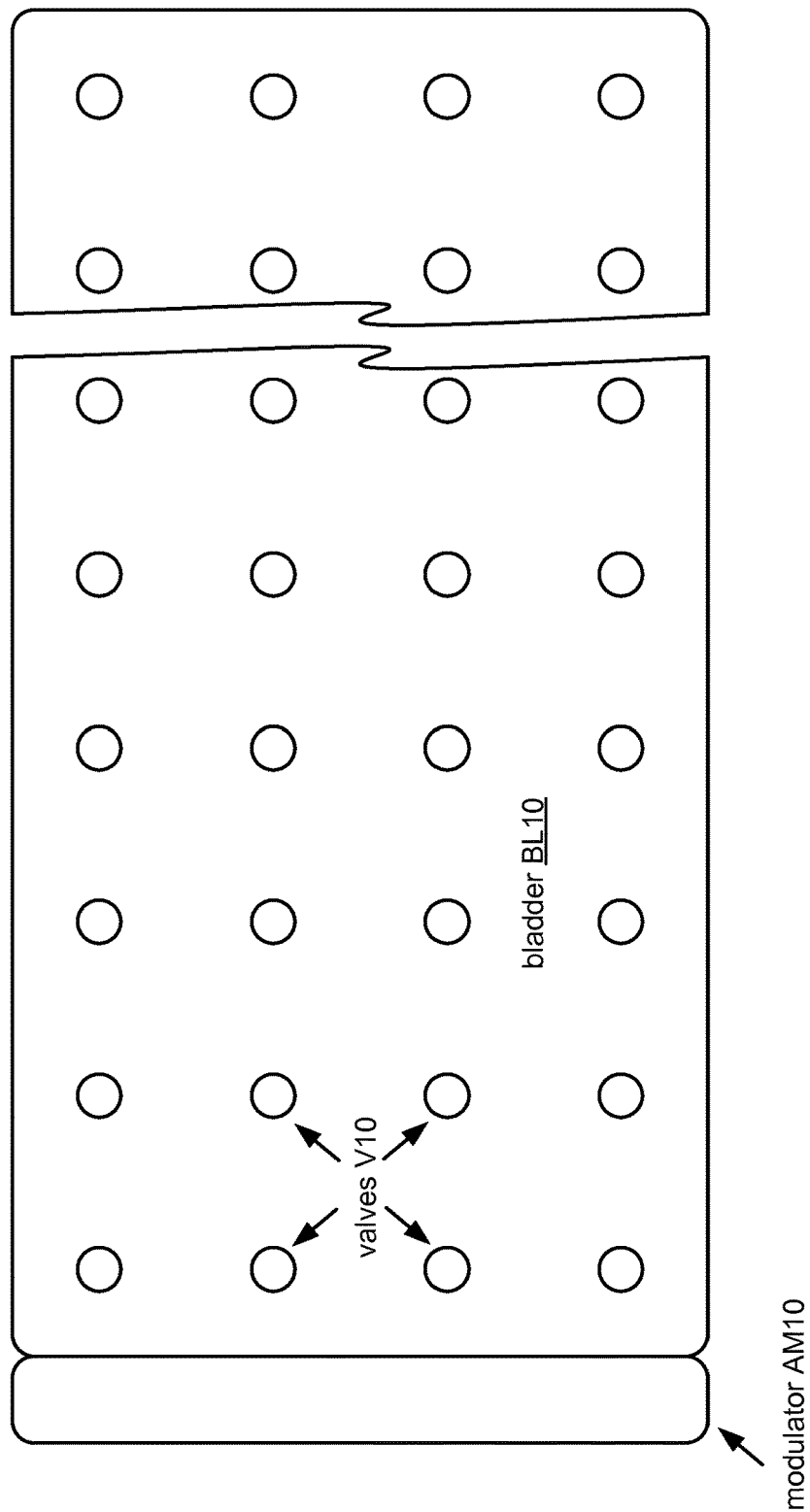
FIGS. 20, 22, and 23 show top surfaces of examples of bladder BL10 provided with a set of one-way valves.
Figure 23:
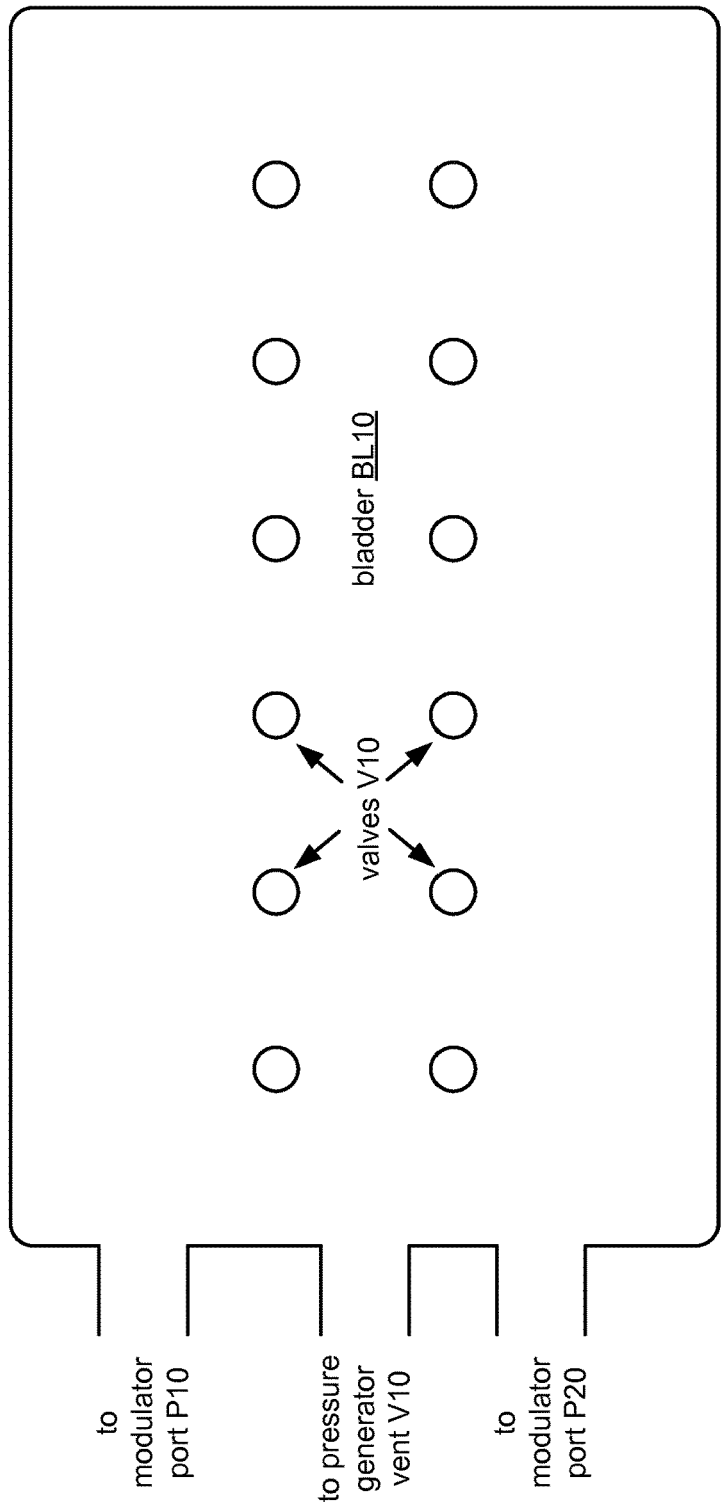

The valves may be arranged in a rectangular pattern as shown in FIG. 20 (in which each of the circles depicted on the top surface of bladder BL10 represents a valve V10), or in a diamond or hexagonal pattern, or in any other pattern of uniform distribution over the top surface of bladder BL10 or some region thereof. It may be desirable to provide the valves only in a central region of the top surface and not along the margins (e.g., as shown in FIG. 23, in which each of the circles depicted on the top surface of bladder BL10 represents a valve V10), as debris in the middle will have further to travel for removal and may also encounter a smaller downward gradient of the top surface initially.

Figure 22:
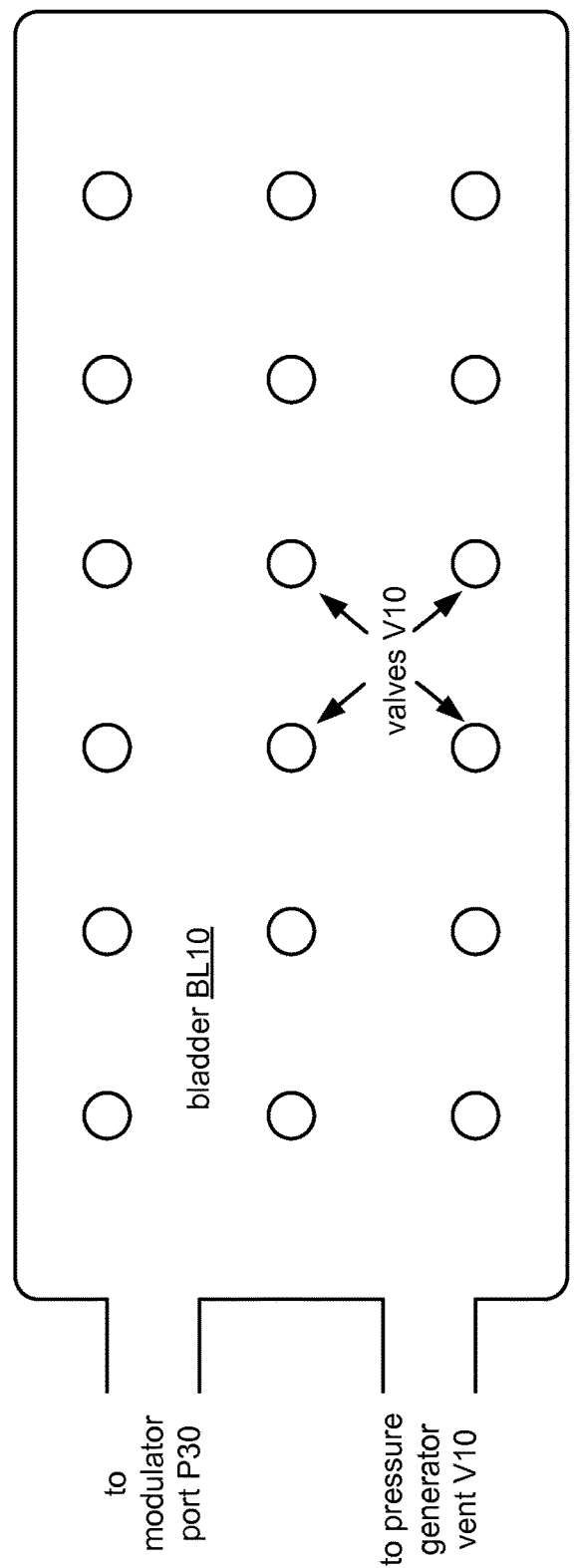

Examples of one-way valves (also called "check valves") that may be used include reed valves and umbrella valves. FIGS. 21A and 21B show cross-sectional and top views of an umbrella valve, respectively. FIGS. 21C and 21D show cross-sectional views of such a valve as installed in a hole in bladder BL10. FIG. 21C shows the valve when the pressure within the bladder is below the activation pressure, and FIG. 21D shows the valve during high-pressure activation. FIG. 22 (in which each of the circles depicted on the top surface of bladder BL10 represents a valve V10) and 23 show examples of necked implementations of bladder BL10 that include such a plurality of one-way valves in the top surface.

It may be desirable to use valves having different release pressures at different locations of the top surface, depending on the expected distribution of pressure within chamber CH10, such that all of the valves may be expected to open in response to the same activating pressure at the discharge of pressure generator PG10. Alternatively, it may be desirable to use valves having different release pressures at different locations of the top surface to enable selection, by selecting an appropriate activating pressure, among (A) activation of all of the valves and (B) activation of only a proper subset of the set of all of the valves. For example, valves along and/or near to a central principal axis of the top surface may be configured to release in response to a lower activation pressure than valves located farther away from this axis.

It may be desirable to provide a reinforcement of bladder BL10 at the valve seat (e.g., at the interior of the bladder or cover, to prevent expulsion of the valve) and/or at the flow orifices. FIGS. 24A and 24B show top and cross-sectional views, respectively, of a washer W10 installed to reinforce the valve seat of bladder BL10. FIGS. 24C and 24D show top and cross-sectional views, respectively, of a washer W20 installed to reinforce the valve seat and the flow orifices of bladder BL10. Examples of materials from which washers W10, W20 may be made include nylon, polyester, and stainless steel.

It may be desirable for system S100 to include a pressure sensor to indicate the air pressure within bladder BL10. Such indication may be used (e.g., by control unit CU10) to detect when this pressure is sufficient to trigger an automatic change from inflation mode to vibration mode, or to prompt the user to initiate the vibration mode. Additionally or alternatively, such indication may be used by control unit CU10 to control pressure generator PG10 such that the blower speed is higher during inflation and is then reduced when a pressure sufficient for vibration has been reached.

Control unit CU10 may be implemented to be driven mechanically (e.g., by a coiled spring), electro-mechanically (e.g., by a motor), or electronically (e.g., by a timing circuit) to activate the various modes in sequence according to the desired timing cycle. Such sequenced activation may be performed by actuating and de-actuating appropriate switches, relays, or switching circuits (e.g., a circuit including one or more semiconductor switching devices, such as silicon controlled rectifiers or insulated-gate bipolar transistors). Alternatively or additionally, control unit CU10 may be implemented to include one or more fixed or programmable arrays of logic elements (e.g., microprocessors, microcontrollers, programmable logic devices, programmable logic controllers, etc.) configured to execute one or more sets of instructions (e.g., an algorithm) to perform such sequencing and/or other tasks (e.g., oscillator frequency and/or waveform selection, oscillator waveform generation, voltage and/or current monitoring, blower speed control, etc.), which may be based on indications from one or more sensors as described herein.

It may be desirable for control unit CU10 to include a watchdog timer configured to shut down the system after some time period, and/or a voltage monitor configured to shut down the system when the supply voltage falls below a threshold value, to prevent excessive discharge of the battery system. Another control feature that may be included is one or more temperature sensors to protect the coil of each of one or more of the transducers within acoustic modulator AM10.

It may be desirable to provide at least one pressure sensor within chamber CH10 to indicate air pressure within the chamber. For example, such information may be used as feedback (e.g., by control unit CU10) to control pressure generator PG10 to limit pressure within the chamber and/or to maintain a desired activation pressure during blowing mode. Additionally or alternatively, such information indicating pressure within the chamber may be used (e.g., by control unit CU10) in conjunction with a pressure as indicated by a pressure sensor at a discharge of pressure generator PG10 to detect leaks in the chamber.

It may be desirable to vary the frequency of the acoustic modulation in response to environmental conditions. For example, the optimal frequency for transferring energy from the transducers to the pressurized mass of air may depend on factors including the mass of air and the speed of sound, which is turn depend on the temperature and humidity of the air. System S100 may include one or more temperature sensors to indicate the air temperature and/or one or more humidity sensors to indicate the relative humidity of the air. Such sensors may be located at the intake and/or discharge of pressure generator PG10, within bladder BL10, within one or more ports of acoustic modulator AM10, and/or within one or more boxes of acoustic modulator AM10. Additionally or alternatively, system S100 may include one or more mass air flow sensors to indicate the mass flowrate of air at the intake of pressure generator PG10. Control unit CU10 may be programmed with an algorithm to select, in response to such sensor indications, one or more particular oscillation frequencies and/or waveforms for driving the transducers of acoustic modulator AM10 during a vibration mode.

Figure 28:
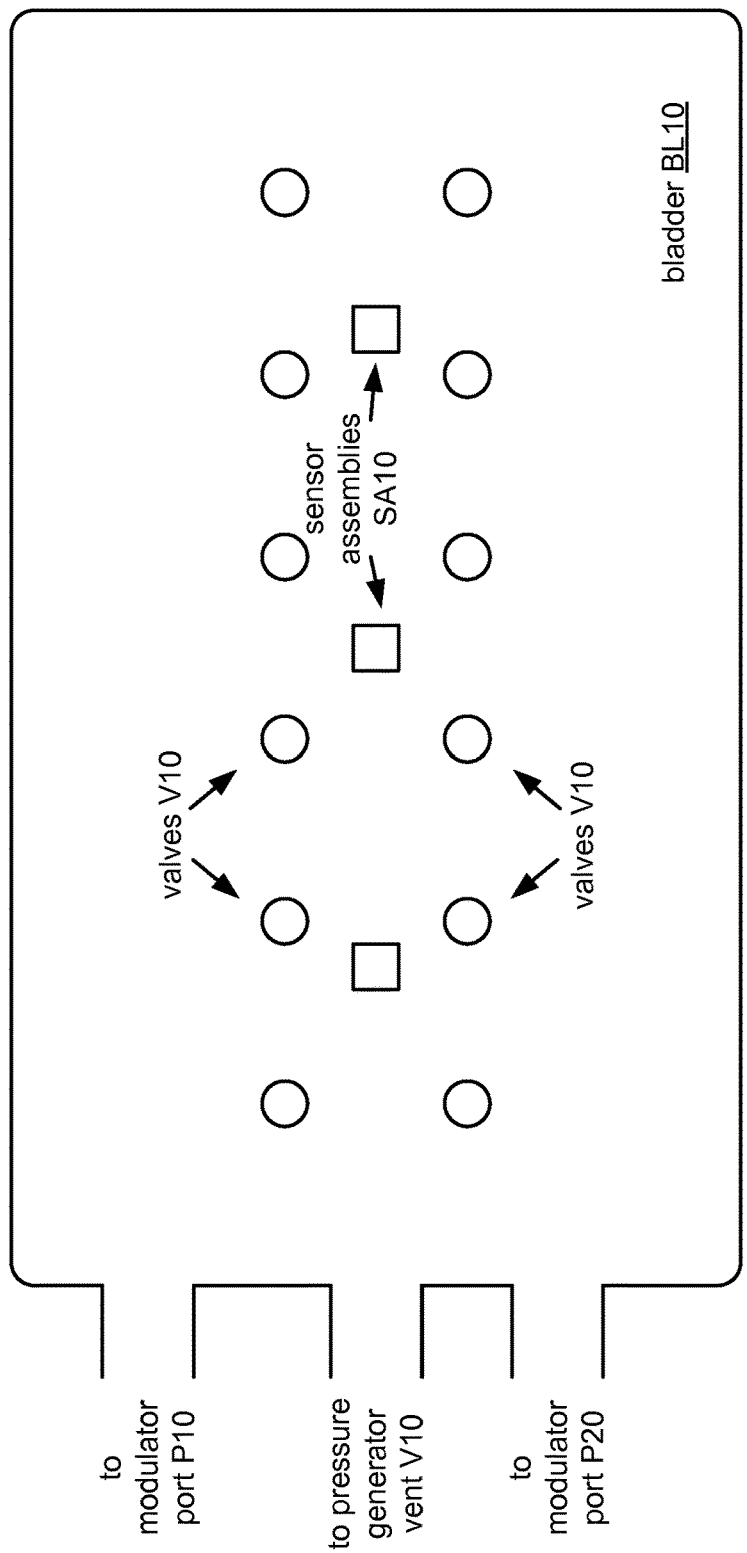
FIG. 28 shows a top surface of an example of bladder BL10 provided with a set of sensor assemblies SA10.

In another example, one or more accelerometers may be installed inside or within the top surface of bladder BL10 to indicate movement of this surface at the respective location. For example, the cover (e.g., the top surface of bladder BL10) may include one or more sensor assemblies (e.g., as shown in FIG. 28, which shows relative placements of three sensor assemblies SA10 indicated as squares and also shows twelve valves V10 indicated as circles) configured to obtain information relating to movement of the top surface at the sensor location in a direction normal to the surface and to transmit such information wirelessly. Such a sensor assembly includes an accelerometer or other position or displacement sensor and may also include a module for wireless communication (or at least transmission) and an energy harvester. Two or more among the sensor, module, and harvester may be integrated into a single package. A sensor assembly may be embedded between layers of the surface, adhered to an inner or outer side of the surface, and/or attached to the surface via one or more through-holes in one or more layers of the surface.

The number and placement of the sensor assemblies may be selected as desired to support, for example, detection of harmonic vibration modes along a principal (e.g., longitudinal) and/or secondary (e.g., transverse) axis of the cover (e.g., the top surface of bladder BL10) as the modulation frequency is varied and subsequent selection of a desired mode. The order of a harmonic mode (or standing wave) may be identified, if movement of the surface is sufficiently sampled in space and time, according to locations of peaks and nodes as indicated by the sensors (see, e.g., the depiction of the first four standing wave orders along an axis of the cover, as shown in FIG. 26C but not to scale). In such case, control unit CU10 may be configured to select the modulation frequency that resulted in the desired detected harmonic mode.

The sensor may be implemented as a single-axis accelerometer arranged to sense movement of the top surface in a direction normal to the surface. Examples of such devices include MEMS accelerometers and piezoelectric accelerometers, and an accelerometer having more than one axis (e.g., a two-axis or triaxial accelerometer) may also be used. Examples of companies that currently offer such sensors include Analog Devices, Inc. (Norwood, Mass.); PCB Piezoelectronics, Inc., (Depew, N.Y.); Texas Instruments (Dallas, Tex.); STMicroelectronics (Geneva, CH); and Freescale Semiconductor (Austin, Tex.).

Examples of wireless communication protocols that may be used by the module to transmit the movement information include ZigBee (IEEE 802.15.4), ZigBee RF4CE, Bluetooth, Bluetooth low energy, and sub-1 GHz radio protocols. Examples of companies that currently offer such modules include Texas Instruments, Freescale, Toshiba Corporation (Tokyo, JP), and Microchip Technology Inc. (Chandler, Ariz.).

The energy harvester may be configured to harvest kinetic energy arising from movement of the surface in the normal direction and/or energy arising from the pressure differential between the interior and exterior of chamber CH10 (e.g., bladder BL10). The energy harvester may include a vibration transducer (i.e., piezoelectric or electromagnetic) configured to provide the harvested energy and a power-management circuit configured to convert the harvested energy according to the power requirements of the sensor and wireless module. The power-management circuit may be configured to store the energy in an integrated or separate capacitor. In some cases, at least the power-management circuit and the wireless communication/transmission module may be integrated into a single package. Examples of companies that currently offer such components include Maxim Integrated (San Jose, Calif.), Mide Technology Corp. (Medford, Mass.), Perpetuum Ltd (Southampton, UK), and Ferro Solutions, Inc. (Woburn, Mass.). Of course, transfer of power and/or information between a sensor and control unit CU10 may also be accomplished via wires and/or other conductors.

Such indication of movement may be used by control unit CU10 to compare the extent of the displacements of the surface resulting from each of two or more different oscillation frequencies and/or waveforms for driving the transducers of acoustic modulator AM10 during vibration and to select the oscillation frequency and/or waveform that provides the largest displacement under the current environmental conditions. Control unit CU10 may be implemented to receive the transmitted movement information and use it to determine a resonant frequency of chamber CH10 (e.g., of bladder BL10).

It may be desirable to operate acoustic modulator AM10 to modulate the air pressure within the chamber at a resonant frequency of the chamber. For example, such operation may be expected to maximize transfer of energy to the accumulated debris. The resonant frequency is roughly determined by the volume of the chamber and may be measured for a given bladder before operation or estimated, for a specified air pressure, from the dimensions and elasticity of the bladder.

To maximize the transfer of energy to the air mass within bladder BL10, it may be desirable to design acoustic modulator AM10 and bladder BL10 to have resonant frequencies that are similar or harmonically related to one another. The resonant frequency of the chamber may also vary depending on other factors, however, which may include humidity, air temperature, and the weight and distribution of accumulated debris on the top surface of the chamber. Additionally, for a case in which the cover is mounted over an open cavity (e.g., over the bed of a dump truck or pickup truck) to form chamber CH10, a resonant frequency of the chamber may also vary depending on the current volume of the cavity (e.g., depending on the volume of the load carried in the bed).

Accordingly, it may be desirable to implement control unit CU10 to determine a desired modulation frequency based on information provided by one or more sensors as described above. Examples of such a procedure are described below with reference to task T200A.

For a case in which transfer of energy from bladder BL10 to the surface and/or interior of the vehicle is a concern, it is also possible for system S100 to include one or more movement sensors on and/or under the top surface of the vehicle, to indicate movement of that surface, and/or one or more pressure sensors within the vehicle, to indicate pressure variation within the vehicle. In such case, control unit CU10 may be configured to vary the modulation frequency (e.g., to select a different harmonic mode) and/or waveform to reduce coupling of acoustic energy from bladder BL10 to the surface and/or interior of the vehicle.

As described above, acoustic modulator AM10 may be mounted on the top surface of the vehicle along with bladder BL10. In another example, acoustic modulator AM10 is mounted in another location, such as on a front side of the vehicle as shown in the side and front views of FIGS. 26A and 26B, respectively. Such an arrangement allows an arbitrarily long port length. Increasing the port volume (e.g., by increasing its length in such manner) may allow the modulator to use a lower modulation frequency, which may lead to higher variance of the pressure within bladder BL10 and/or to increased displacement of the top surface of bladder BL10 during vibration. In a further example, pressure generator PG10 and acoustic modulator AM10 may be implemented as a portable unit, or provided at a fixed location, enabling serial use with multiple bladders installed on respective vehicles (e.g., a fleet of vehicles, such as a fleet of delivery trucks or school buses).

Figure 27D:
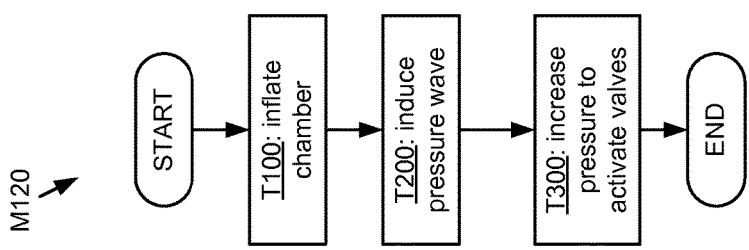
FIG. 27D shows a flowchart for an implementation M120 of method M100.
Figure 27C:
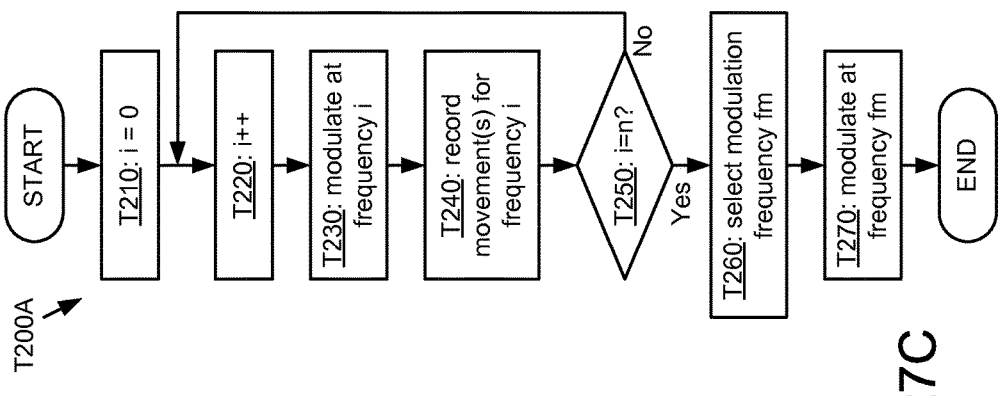
FIG. 27C shows a flowchart for an implementation T200A of task T200.
Figure 27B:
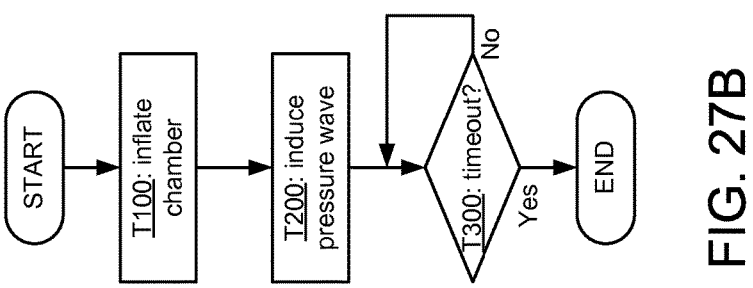
FIG. 27B shows a flowchart for an implementation M110 of method M100.
Figure 27A:
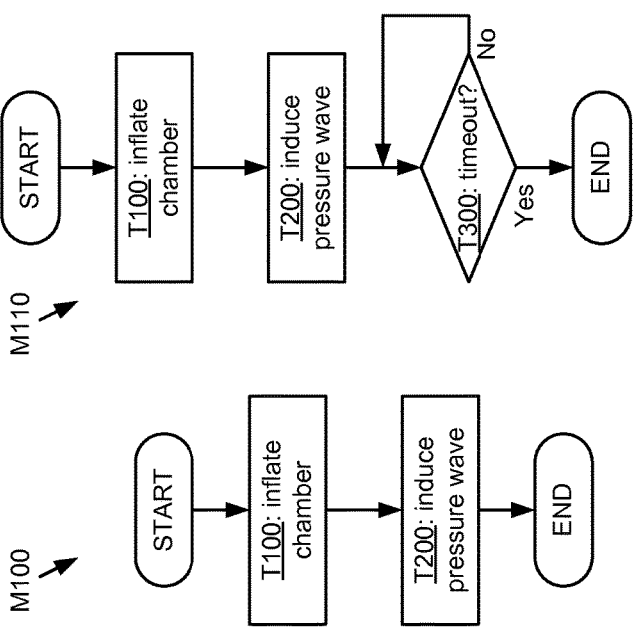
FIG. 27A shows a flowchart for a method M100 for debris removal.

FIG. 27A shows a flowchart for a method M100 for debris removal that includes tasks T100 and T200. Task T100 inflates a chamber to an air pressure that is higher than an air pressure of an ambient environment of the chamber (e.g., using any implementation of pressure generator PG10 as described herein). A top of the chamber (which may be, e.g., any implementation of bladder BL10 as described herein) is an elastic surface configured to stretch outward in response to the higher pressure. Task T100 may be implemented to continue to increase the pressure within the chamber until the desired higher pressure is achieved, and then to maintain such higher pressure. Task T200 induces a pressure wave within the inflated chamber (e.g., using any implementation of acoustic modulator AM10 as described herein), causing the elastic surface to oscillate in response to the pressure wave.

FIG. 27B shows a flowchart for an implementation M110 of method M100 that also includes a timeout task T300, which terminates the method after a predetermined time interval (beginning, for example, at the start of task T100 or at the start of task T200) has elapsed. For example, task T300 may be implemented to terminate the method upon expiration of a period after the start of task T200 (e.g., a period in the range of 15-60 seconds, such as 15, 30, 45, or 60 seconds). In another example, task T300 may be implemented to terminate the method upon expiration of a period after the start of task T100 (e.g., a period in the range of 30-120 seconds, such as 30, 60, 90, or 120 seconds). In a further example, task T300 may be implemented to terminate the method upon the earliest expiration of (A) a period after the start of task T200 (e.g., any one of the examples above) and (B) a period after the start of task T100 (e.g., any one of the examples above).

FIG. 27C shows a flowchart for an implementation T200A of task T200 that includes subtasks T210, T220, T230, T240, T250, T260, and T270. Task T210 initializes a loop index variable (e.g., to zero or one), task T220 increments the index, and task T250 determines whether all of the desired number n of indexed values have been considered. One of skill in the art will recognize that any other loop construct suitable for considering a desired range of indexed values may be used. The loop may be implemented to change the frequency between desired initial and terminal values (e.g., five and twenty or thirty Hz, respectively) at increments of, for example, one, two, three, four, five, six, seven, eight, nine, or ten Hz.

Task T230 induces a pressure wave at the current frequency i (e.g., drives acoustic modulator AM10 at modulation frequency i). Task T240 records information relating to one or more movements of the elastic surface in response to the pressure wave at frequency i. For example, task T240 may be implemented to receive information from one or more movement sensors (e.g., sensor assemblies SA100) as described herein. It may be desirable to delay the start of task T240 relative to the start of task T230 (e.g., by one, two, three, four, five, six, seven, eight, nine, or ten seconds) to permit the system to stabilize before recording the movement information. Task T240 may be implemented to continue to record movement information for the current frequency i for a period of, for example, one, two, three, four, five, six, seven, eight, nine, or ten seconds.

Based on the recorded movement information for the n frequencies, task T260 selects a modulation frequency fm. Task T260 may be configured to select, for example, (A) the frequency at which the maximum displacement (alternatively, acceleration) of any sensor was recorded, (B) the frequency at which the highest number of sensors indicated a maximum displacement (alternatively, acceleration), or (C) the frequency at which the average maximum displacement (alternatively, acceleration) among the sensors was greatest. For harmonic mode determination, task T260 may also be configured to detect and consider nodes, peaks, and phase relations between peaks at a frequency. Changes in sign of acceleration may be used to indicate a frequency of vibration at the location of a sensor (e.g., for harmonic mode determination). Modulation frequency fm may be one among the n frequencies, a harmonic of such a frequency, or a frequency interpolated between two or more of the n frequencies. Task T270 uses the selected modulation frequency fm to induce a pressure wave within the inflated chamber (e.g., using any implementation of acoustic modulator AM10 as described herein) for a desired period of time.

FIG. 27D shows a flowchart for an implementation M120 of method M100 that also includes a task T300, which increases the inflated air pressure within the chamber to a pressure that is higher than an activation pressure of one or more one-way valves (e.g., valves V10 as described herein) that are configured to pass air from an interior of the chamber to an exterior of the chamber.

The foregoing presentation of the described embodiments is provided to enable any person skilled in the art to make or use the methods and other structures disclosed herein. The flowcharts and other structures shown and described herein are examples only, and other variants of these structures are also within the scope of the disclosure. Various modifications to these embodiments are possible, and the generic principles presented herein may be applied to other embodiments as well. Thus, the present invention is not intended to be limited to the embodiments shown above but rather is to be accorded the widest scope consistent with the principles and novel features disclosed in any fashion herein, including in the attached claims as filed, which form a part of the original disclosure.

Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." The term "plurality" means "two or more." Any incorporation by reference of a portion of a document shall also be understood to incorporate definitions of terms or variables that are referenced within the portion, where such definitions appear elsewhere in the document, as well as any figures referenced in the incorporated portion.

What is claimed is:

1. A system comprising:
a pressure generator arranged to increase a pressure of a mass of air within a chamber;
an acoustic modulator arranged to modulate the increased pressure of the mass of air within the chamber; and
an elastic surface arranged to form a top of the chamber and configured to stretch outward in response to said increased pressure and to oscillate in response to said air pressure modulation,
wherein said pressure generator is arranged to inflate the chamber through a channel to the chamber, and wherein said acoustic modulator is arranged to induce the pressure wave through a port that is separate from the channel.

2. A system comprising:
a pressure generator arranged to inflate a chamber to a pressure that is higher than a pressure of an ambient environment of the system;
an acoustic modulator arranged to induce a pressure wave within the inflated chamber; and
an elastic surface arranged to form a top of the chamber and configured to stretch outward in response to said higher pressure and to oscillate in response to said pressure wave.

3. The system according to claim 2, wherein said pressure generator is an axial-flow blower arranged to force air into the chamber.

4. The system according to claim 2, wherein said acoustic modulator is configured to induce the pressure wave in a mass of air within the chamber, and wherein said pressure wave has a frequency of between five and twenty Hertz.

5. The system according to claim 2, wherein said acoustic modulator includes an acoustic bandpass filter of order at least six.

6. The system according to claim 2, wherein said acoustic modulator includes at least one ported cavity.

7. The system according to claim 2, wherein said acoustic modulator includes at least two ports.

8. The system according to claim 2, wherein said acoustic modulator includes at least one pair of acoustic transducers in an isobaric arrangement.

9. The system according to claim 2, wherein said acoustic modulator includes a pair of acoustic transducers, each transducer having a diaphragm, wherein the pair is arranged such that a volume of air is enclosed between said diaphragms.

10. The system according to claim 9, wherein the pair is arranged such that the diaphragm of each transducer is configured to create a pressure wave within a respective ported cavity.

11. The system according to claim 2, wherein said chamber is an inflatable bladder, and wherein said elastic surface is a top surface of the bladder.

12. The system according to claim 11, wherein said bladder is arranged to cover at least fifty percent of a top exterior surface of a semi-trailer.

13. The system according to claim 11, wherein said bladder is arranged to cover at least fifty percent of a top exterior surface of a vehicle.

14. The system according to claim 11, wherein a length of said bladder is at least five times a width of said bladder.

15. The system according to claim 11, wherein said top surface consists essentially of an elastomer.

16. The system according to claim 11, wherein said top surface includes a plurality of one-way valves, wherein each of said plurality of valves is configured to pass air from inside the chamber to the exterior of the chamber when the pressure within the chamber exceeds an activation pressure of the valve.

17. The system according to claim 2, wherein said system includes:
   at least one sensor configured to provide information describing a movement of said elastic surface; and
   a control unit configured to select a modulation frequency based on said information, and
   wherein said acoustic modulator is configured to induce said pressure wave by driving at least one acoustic transducer at the selected modulation frequency.

18. The system according to claim 2, wherein said pressure generator is arranged to inflate the chamber through a channel to the chamber, and wherein said acoustic modulator is arranged to induce the pressure wave through a port that is separate from the channel.

19. A method comprising:
   inflating a chamber to an air pressure that is higher than an air pressure of an ambient environment of the chamber; and
   inducing a pressure wave within the inflated chamber,
   wherein a top of said chamber is an elastic surface configured to stretch outward in response to said higher pressure, and
   wherein said inducing causes said elastic surface to oscillate in response to said pressure wave, and
   wherein said inflating the chamber is performed through a channel to the chamber, and wherein said inducing the pressure wave is performed through a port that is separate from the channel.

20. The method according to claim 19, wherein said inducing the pressure wave includes driving at least one pair of acoustic transducers, each transducer having a diaphragm, wherein the pair is arranged such that a volume of air is enclosed between said diaphragms.

21. The method according to claim 19, wherein said chamber is an inflatable bladder, and wherein said elastic surface is a top surface of the bladder.

* * * * *